United States Patent
Williams et al.

(10) Patent No.: US 8,700,524 B2
(45) Date of Patent: Apr. 15, 2014

(54) SYSTEMS AND METHODS TO RESTRICT PAYMENT TRANSACTIONS

(75) Inventors: Michael Williams, Chesterfield (GB); Jonathan Michael Kingston, Chesterfield (GB); Kelly Jane Mullins, Chesterfield (GB)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 13/071,158

(22) Filed: Mar. 24, 2011

(65) Prior Publication Data

US 2012/0171990 A1 Jul. 5, 2012

Related U.S. Application Data

(60) Provisional application No. 61/429,695, filed on Jan. 4, 2011.

(51) Int. Cl.
*G06Q 40/00* (2012.01)

(52) U.S. Cl.
USPC .................................. 705/39; 705/44; 705/318

(58) Field of Classification Search
USPC .............. 705/39, 40, 27.1, 34, 67, 64, 76, 44, 705/318; 455/406, 558, 409; 235/375, 380, 235/492; 709/203
See application file for complete search history.

(56) References Cited

U.S. PATENT DOCUMENTS

| | | | |
|---|---|---|---|
| 5,283,829 A | | 2/1994 | Anderson |
| 5,696,908 A | * | 12/1997 | Muehlberger et al. ........... 705/39 |
| 5,708,422 A | | 1/1998 | Blonder et al. |
| 5,765,106 A | * | 6/1998 | Violante et al. ................ 455/410 |
| 5,768,383 A | * | 6/1998 | Sansone et al. ................ 380/247 |
| 5,818,915 A | * | 10/1998 | Hayes et al. ................... 455/405 |
| 5,839,058 A | * | 11/1998 | Phillips et al. .............. 455/575.1 |
| 5,845,260 A | | 12/1998 | Nakano et al. |
| 5,870,459 A | * | 2/1999 | Phillips et al. ................ 455/409 |
| 5,905,873 A | | 5/1999 | Hartmann et al. |

(Continued)

FOREIGN PATENT DOCUMENTS

| | | |
|---|---|---|
| GB | 2379525 | 3/2003 |
| JP | 2007109014 | 4/2007 |

(Continued)

OTHER PUBLICATIONS

Zabawskyj, Bohdan, "In the Media: The Mobile Money Opportunity," Sep. 2007 Billing World and OSS Today.*

(Continued)

*Primary Examiner* — Kelly Campen
(74) *Attorney, Agent, or Firm* — Stephen M. De Klerk

(57) ABSTRACT

Systems and methods are provided to selectively restrict payment transactions. In one aspect, a system includes: a data storage facility to store restriction data in association with a phone number; and an interchange coupled with the data storage facility. The interchange includes a common format processor and a plurality of converters to interface with mobile controllers. The converters are configured to communicate with the controllers in different formats and to communicate with the common format processor in a common format. In response to a payment request identifying the phone number and a merchant, the common format processor determines whether to reject the payment request based at least in part on the restriction data and the identity of the merchant. If the request is not rejected, the common format processor uses one of the converters to communicate with a telephonic apparatus at the phone number to confirm the payment request.

18 Claims, 18 Drawing Sheets

(56) References Cited

U.S. PATENT DOCUMENTS

| | | | |
|---|---|---|---|
| 5,914,472 A | 6/1999 | Foladare et al. | |
| 5,946,613 A * | 8/1999 | Hayes et al. | 455/406 |
| 5,953,710 A | 9/1999 | Fleming | |
| 6,035,043 A * | 3/2000 | Sansone et al. | 380/250 |
| 6,227,447 B1 | 5/2001 | Campisano | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,788,771 B2 | 9/2004 | Manto | |
| 6,807,410 B1 | 10/2004 | Pailles et al. | |
| 6,928,558 B1 | 8/2005 | Allahwerdi et al. | |
| 6,965,872 B1 | 11/2005 | Grdina | |
| 6,996,409 B2 | 2/2006 | Gopinath et al. | |
| 7,013,125 B2 | 3/2006 | Henrikson | |
| 7,080,049 B2 | 7/2006 | Truitt et al. | |
| 7,089,208 B1 | 8/2006 | Levchin et al. | |
| 7,107,068 B2 | 9/2006 | Benzon et al. | |
| 7,174,301 B2 | 2/2007 | Florance et al. | |
| 7,221,951 B2 | 5/2007 | Anvekar et al. | |
| 7,292,996 B2 | 11/2007 | Nobrega et al. | |
| 7,308,254 B1 | 12/2007 | Rissanen | |
| 7,315,541 B1 | 1/2008 | Housel et al. | |
| 7,331,518 B2 | 2/2008 | Rable | |
| 7,357,310 B2 | 4/2008 | Calabrese et al. | |
| 7,366,702 B2 | 4/2008 | David | |
| 7,374,079 B2 * | 5/2008 | Nam et al. | 235/379 |
| 7,386,477 B2 | 6/2008 | Fano | |
| 7,413,119 B2 | 8/2008 | Kubo et al. | |
| 7,437,331 B1 | 10/2008 | Rosenberger | |
| 7,458,507 B2 | 12/2008 | Fillinger et al. | |
| 7,478,055 B2 | 1/2009 | Goino | |
| 7,487,114 B2 | 2/2009 | Florance et al. | |
| 7,527,192 B1 | 5/2009 | Chaskin et al. | |
| 7,558,777 B1 | 7/2009 | Santos | |
| 7,660,772 B2 | 2/2010 | Verkama | |
| 7,748,614 B2 | 7/2010 | Brown | |
| 7,752,135 B2 | 7/2010 | Brown et al. | |
| 7,792,518 B2 | 9/2010 | Trioano et al. | |
| 7,848,500 B2 | 12/2010 | Lynam et al. | |
| 7,848,980 B2 | 12/2010 | Carlson | |
| 7,870,044 B2 | 1/2011 | Robertson | |
| 7,870,077 B2 | 1/2011 | Woo et al. | |
| 7,890,433 B2 | 2/2011 | Singhal | |
| 8,073,774 B2 | 12/2011 | Pousti | |
| 8,116,730 B2 | 2/2012 | Smith | |
| 8,245,044 B2 | 8/2012 | Kang | |
| 8,280,906 B1 | 10/2012 | Lillibridge et al. | |
| 8,386,353 B2 * | 2/2013 | Hirson et al. | 705/35 |
| 8,392,274 B2 * | 3/2013 | Hirson | 705/26.1 |
| 8,412,155 B2 * | 4/2013 | McCanna et al. | 455/407 |
| 8,412,626 B2 * | 4/2013 | Hirson et al. | 705/39 |
| 8,478,734 B2 * | 7/2013 | Niejadlik | 707/709 |
| 8,548,426 B2 * | 10/2013 | Smith | 455/406 |
| 2001/0003093 A1 | 6/2001 | Lundin | |
| 2001/0037264 A1 | 11/2001 | Husemann et al. | |
| 2002/0004751 A1 | 1/2002 | Seki et al. | |
| 2002/0013727 A1 | 1/2002 | Lee | |
| 2002/0016769 A1 | 2/2002 | Barbara et al. | |
| 2002/0017561 A1 | 2/2002 | Tomoike | |
| 2002/0035539 A1 | 3/2002 | O'Connell | |
| 2002/0059146 A1 | 5/2002 | Keech | |
| 2002/0087471 A1 | 7/2002 | Ganesan et al. | |
| 2002/0111908 A1 | 8/2002 | Milberger et al. | |
| 2002/0120582 A1 | 8/2002 | Elston et al. | |
| 2002/0193094 A1 | 12/2002 | Lawless et al. | |
| 2003/0023505 A1 | 1/2003 | Eglen et al. | |
| 2003/0065525 A1 | 4/2003 | Giacchetti et al. | |
| 2003/0119478 A1 | 6/2003 | Nagy et al. | |
| 2003/0125969 A1 | 7/2003 | Kizer et al. | |
| 2003/0126076 A1 | 7/2003 | Kwok | |
| 2003/0212601 A1 | 11/2003 | Silva et al. | |
| 2004/0019564 A1 | 1/2004 | Goldhwaite et al. | |
| 2004/0044582 A1 | 3/2004 | Chowdhary | |
| 2004/0122685 A1 | 6/2004 | Bunce | |
| 2004/0185827 A1 | 9/2004 | Parks | |
| 2004/0230527 A1 | 11/2004 | Hansen et al. | |
| 2004/0248596 A1 | 12/2004 | Panchal | |
| 2004/0252814 A1 | 12/2004 | Eakin | |
| 2005/0055296 A1 | 3/2005 | Hattersley et al. | |
| 2005/0055309 A1 | 3/2005 | Williams et al. | |
| 2005/0086164 A1 | 4/2005 | Kim et al. | |
| 2005/0177442 A1 | 8/2005 | Sullivan et al. | |
| 2005/0177517 A1 | 8/2005 | Leung et al. | |
| 2005/0197892 A1 | 9/2005 | Bilibin et al. | |
| 2005/0199709 A1 | 9/2005 | Linlor | |
| 2005/0245257 A1 | 11/2005 | Woodhill | |
| 2006/0018450 A1 | 1/2006 | Sandberg-Diment | |
| 2006/0121880 A1 | 6/2006 | Cowsar et al. | |
| 2006/0131390 A1 | 6/2006 | Kim | |
| 2006/0206709 A1 | 9/2006 | Labrou et al. | |
| 2006/0248011 A1 | 11/2006 | Hecht-Nielsen | |
| 2006/0253335 A1 | 11/2006 | Keena et al. | |
| 2006/0258331 A1 | 11/2006 | Syrett et al. | |
| 2006/0259438 A1 | 11/2006 | Randle et al. | |
| 2006/0276171 A1 | 12/2006 | Pousti | |
| 2006/0294025 A1 | 12/2006 | Mengerink | |
| 2007/0005467 A1 | 1/2007 | Haigh et al. | |
| 2007/0011104 A1 | 1/2007 | Leger et al. | |
| 2007/0022019 A1 | 1/2007 | Sherwin et al. | |
| 2007/0027775 A1 | 2/2007 | Hwang | |
| 2007/0027803 A1 | 2/2007 | Brandes et al. | |
| 2007/0043664 A1 | 2/2007 | Wilkes | |
| 2007/0055440 A1 | 3/2007 | Denker et al. | |
| 2007/0061244 A1 | 3/2007 | Ramer et al. | |
| 2007/0063017 A1 | 3/2007 | Chen et al. | |
| 2007/0094080 A1 | 4/2007 | Wilken | |
| 2007/0118477 A1 | 5/2007 | Graves et al. | |
| 2007/0123219 A1 | 5/2007 | Lovell, Jr. | |
| 2007/0123229 A1 | 5/2007 | Pousti | |
| 2007/0124490 A1 | 5/2007 | Kalavade et al. | |
| 2007/0130025 A1 | 6/2007 | Nakajima | |
| 2007/0130044 A1 | 6/2007 | Rowan | |
| 2007/0133768 A1 | 6/2007 | Singh | |
| 2007/0156517 A1 | 7/2007 | Kaplan et al. | |
| 2007/0168462 A1 | 7/2007 | Grossberg | |
| 2007/0175978 A1 | 8/2007 | Stambaugh | |
| 2007/0198510 A1 | 8/2007 | Ebanks | |
| 2007/0203792 A1 | 8/2007 | Rao | |
| 2007/0203836 A1 | 8/2007 | Dodin | |
| 2007/0208632 A1 | 9/2007 | Downes et al. | |
| 2007/0233597 A1 | 10/2007 | Petersen et al. | |
| 2007/0244731 A1 | 10/2007 | Barhydt et al. | |
| 2007/0244811 A1 | 10/2007 | Tummianaro et al. | |
| 2007/0250711 A1 | 10/2007 | Storey | |
| 2007/0255653 A1 | 11/2007 | Tumminard et al. | |
| 2007/0255662 A1 | 11/2007 | Tumminaro et al. | |
| 2007/0260556 A1 | 11/2007 | Pousti | |
| 2007/0265921 A1 | 11/2007 | Rempe | |
| 2007/0266034 A1 | 11/2007 | Pousti | |
| 2007/0266130 A1 | 11/2007 | Mazur et al. | |
| 2007/0270125 A1 | 11/2007 | Pousti | |
| 2008/0009263 A1 | 1/2008 | Pousti | |
| 2008/0010192 A1 | 1/2008 | Rackley, III et al. | |
| 2008/0040139 A1 | 2/2008 | Pousti | |
| 2008/0040265 A1 | 2/2008 | Rackley, III et al. | |
| 2008/0040733 A1 | 2/2008 | Pousti | |
| 2008/0051122 A1 | 2/2008 | Fisher | |
| 2008/0052091 A1 | 2/2008 | Vawter | |
| 2008/0052363 A1 | 2/2008 | Pousti | |
| 2008/0057904 A1 * | 3/2008 | Pousti | 455/406 |
| 2008/0082509 A1 | 4/2008 | Bessieres et al. | |
| 2008/0091614 A1 | 4/2008 | Bas Bayod et al. | |
| 2008/0097851 A1 | 4/2008 | Bemmel et al. | |
| 2008/0103984 A1 | 5/2008 | Choe et al. | |
| 2008/0109279 A1 | 5/2008 | Csoka | |
| 2008/0109528 A1 | 5/2008 | Knight et al. | |
| 2008/0120698 A1 | 5/2008 | Ramia | |
| 2008/0126145 A1 | 5/2008 | Rackley, III et al. | |
| 2008/0133403 A1 | 6/2008 | Hamzeh | |
| 2008/0133735 A1 | 6/2008 | Thayer et al. | |
| 2008/0140569 A1 | 6/2008 | Handel | |

(56) References Cited

U.S. PATENT DOCUMENTS

| | | |
|---|---|---|
| 2008/0154727 A1 | 6/2008 | Carlson |
| 2008/0154772 A1 | 6/2008 | Carlson |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2009/0006184 A1 | 1/2009 | Leach et al. |
| 2009/0006217 A1 | 1/2009 | Smith |
| 2009/0006276 A1 | 1/2009 | Woolston |
| 2009/0024614 A1 | 1/2009 | Pousti |
| 2009/0029687 A1 | 1/2009 | Ramer et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057616 A1* | 3/2010 | Kapur et al. ............ 705/44 |
| 2010/0057623 A1* | 3/2010 | Kapur et al. ............ 705/72 |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffin |
| 2010/0125514 A1 | 5/2010 | Blackhurst et al. |
| 2010/0125737 A1 | 5/2010 | Kang |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191369 A1* | 7/2010 | Kim ............ 700/235 |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith et al. |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |
| 2011/0238483 A1* | 9/2011 | Yoo et al. ............ 705/14.38 |
| 2011/0287748 A1 | 11/2011 | Angel et al. |
| 2011/0295750 A1 | 12/2011 | Rammal |
| 2012/0171990 A1 | 7/2012 | Williams et al. |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO 2006/092726 | 9/2006 |
| WO | WO-2007004792 | 1/2007 |
| WO | WO-2007084593 | 7/2007 |
| WO | 2007102648 | 9/2007 |
| WO | 2007127521 | 11/2007 |
| WO | WO-2009/036511 | 3/2009 |
| WO | 2009044396 | 4/2009 |

OTHER PUBLICATIONS

Sun Microsystems Inc., "The Road to Mobile Banking," Jun. 2008 white paper.*

Amazon.com, Inc., "Get Gold Box Deals Every Day with Amazon Text Alerts," located at http://www.amazon.com/gp/anywhere/sms/goldbox, available at least by Jun. 10, 2009.

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

Federal Trade Commission, "Children's Online Privacy Protection Act (COPPA)," 15 U.S.C. §§ 6501-6506, Oct. 21, 1998.

Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.

International Application No. PCT/US2009/033823, International Search Report and Written Opinion, Sep. 24, 2009.

International Application No. PCT/US2009/039723, International Search Report and Written Opinion, Oct. 30, 2009.

International Application No. PCT/US2010/020189, International Search Report and Written Opinion, Dec. 10, 2010.

International Application No. PCT/US2010/021054, International Search Report and Written Opinion, Jul. 29, 2010.

International Application No. PCT/US2010/024525, International Search Report and Written Opinion, May 17, 2010.

International Application No. PCT/US2010/024535, International Search Report and Written Opinion, May 25, 2010.

International Application No. PCT/US2010/030338, International Search Report & Written Opinion, Jun. 3, 2010.

International Application No. PCT/US2010/032668, International Search Report and Written Opinion, Jul. 1, 2010.

(56) References Cited

OTHER PUBLICATIONS

International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
International Application No. PCT/US2010/057472, International Search Report and Written Opinion, Jan. 18, 2011.
International Application No. PCT/US2010/059295, International Search Report and Written Opinion, Feb. 1, 2011.
International Application No. PCT/US2010/059466, International Search Report and Written Opinion, Feb. 1, 2011.
International Application No. PCT/US2011/022419, International Search Report and Written Opinion, Mar. 29, 2011.
International Application No. PCT/US2011/022426, International Search Report and Written Opinion, Mar. 28, 2011.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.
International Application No. PCT/US12/25195, International Filing Date Feb. 15, 2012, International Search Report and Written Opinion, Apr. 26, 2012.
European Patent Application No. 09711520.8, Extended Search Report mailed Apr. 27, 2011.
International Application No. PCT/US2010/050616, International Search Report and Wrtten Opinion, Apr. 26, 2011.
International Application No. PCT/US2011/30039, International Search Report and Written Opinion, May 23, 2011.
International Application No. PCT/US2011/30038, International Search Report and Written Opinion, May 25, 2011.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod, MobilCash: Worlds First in Mobile Payments, YouTube online video located at http://youtube.com/wacth?v=j6Xv35qSmbg,, Oct. 12, 2007.
Bruene, Jim, "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Nicole, Kirsten , "Pay me Lets You Send and Receive Money Through Facebook", http://mashable.com/2007/06/17pay-me-facebook-app, Jun. 17, 2007.
Onebip S.R.L, "OneBip—to Pay Online with Your Mobile Phone", Youtube online video at http://www.youtube.com/watch?v=RiEsMcc0tJY, May 23, 2007.
Zong, Inc., "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.
Zong, Inc., "Zong Mobile Payment Demo on a Facebook App", You Tube online video at http://www.youtube.com/watch?v=aLjRcAFrGil, Jan. 5, 2009.
Zong, Inc., "Zong-Mobile Payments for Your Web App", You tube online video at http://www.youtube.com/watch?v=O2C3SQraAvQ, Sep. 5, 2008.
Zong, Inc., "Zong Mobile Payments in Smallworlds", You Tube online video at htttp://www.youtube.com/watch?v=Y6CEw3tSgBc, Feb. 10, 2009.
International Preliminary Report on Patentability mailed on Nov. 2, 2012, International Patent Application No. PCT/US11/51094 filed on Sep. 9, 2011.
International Preliminary Report on Patentability, International Application No. PCT/US12/25195, filed Feb. 15, 2012.
"International Application No. PCT/US2011/029760", International Search Report and Written Opinion, Oct. 28, 2011.
"International Application No. PCT/US2011/051094", International Search Report and Written Opinion, Dec. 23, 2011.

\* cited by examiner

SYSTEMS AND METHODS TO RESTRICT PAYMENT TRANSACTIONS

CROSS-REFERENCE TO RELATED APPLICATIONS

The present application claims the benefit of Prov. U.S. Pat. App. Ser. No. 61/429,695, filed Jan. 4, 2011 and entitled "Systems and Methods to Restrict Payment Transactions," the disclosure of which is hereby incorporated herein by reference.

The present application relates to U.S. patent application Ser. No. 12/813,428, filed Jun. 10, 2010 and entitled "Systems and Methods to Provide Access Control via Mobile Phones," which claims priority to Provisional U.S. Patent Application Ser. No. 61/317,591, filed Mar. 25, 2010 and entitled "Systems and Methods to Provide Access Control via Mobile Phones", the disclosures of which applications are hereby incorporated herein by reference.

The present application also relates to U.S. patent application Ser. No. 12/406,077, filed Mar. 17, 2009 and entitled "Systems and Methods to Control Online Transactions," U.S. patent application Ser. No. 12/413,476, filed Mar. 27, 2009 and entitled "Funds Transfer Electronically," and U.S. patent application Ser. No. 12/413,480, filed Mar. 27, 2009 and entitled "Supplier Funds Reception Electronically," the disclosures of which applications are hereby incorporated herein by reference.

FIELD OF THE TECHNOLOGY

At least some embodiments of the disclosure relate to mobile communications in general and, more particularly but not limited to, mobile communications to control access to various online and/or offline activities.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to control online transactions via mobile communications. Some embodiments are summarized in this section.

In one aspect, a system includes a data storage facility to store restriction data in association with a phone number; and an interchange coupled with the data storage facility. The interchange includes a common format processor and a plurality of converters to interface with a plurality of controllers. The converters are configured to communicate with the controllers in different formats and to communicate with the common format processor in a common format.

In one embodiment, the common format processor is configured to receive a payment request identifying the phone number and a merchant and, in response, determine whether to reject the payment request based at least in part on the restriction data and an identity of the merchant. If the payment request is not rejected based on the restriction data and the identity of the merchant, the common format processor is to use one converter of the converters to communicate with a telephonic apparatus at the phone number to confirm the payment request and to transmit a notification to the merchant after the confirmation and/or the processing of the payment request.

In another aspect, a computer-implemented method includes: storing, in a computing device, restriction data in association with a phone number; receiving, in the computing device, a payment request identifying the phone number and a merchant; determining, by the computing device, whether to reject the payment request based at least in part on the restriction data and an identity of the merchant; if the payment request is not rejected based on the determining, communicating with a telephonic apparatus at the phone number to confirm the payment request; and after confirmation of the payment request, transmitting a notification to the merchant.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange is coupled with a data storage facility that stores data associating two or more telephone numbers of mobile devices, such as cellular phones, operated by different users. The interchange allows one of the mobile devices to control the purchase requests confirmed via the other mobile devices and/or to provide funds for the approved purchase requests. The interchange can be used to associate account information with phone numbers to facilitate electronic payments via the mobile devices, or to collect funds via the phone bills of the mobile devices. The interchange is configured to communicate with the mobile phones through the different controllers to provide security and convenience for online transactions.

Figure 1:
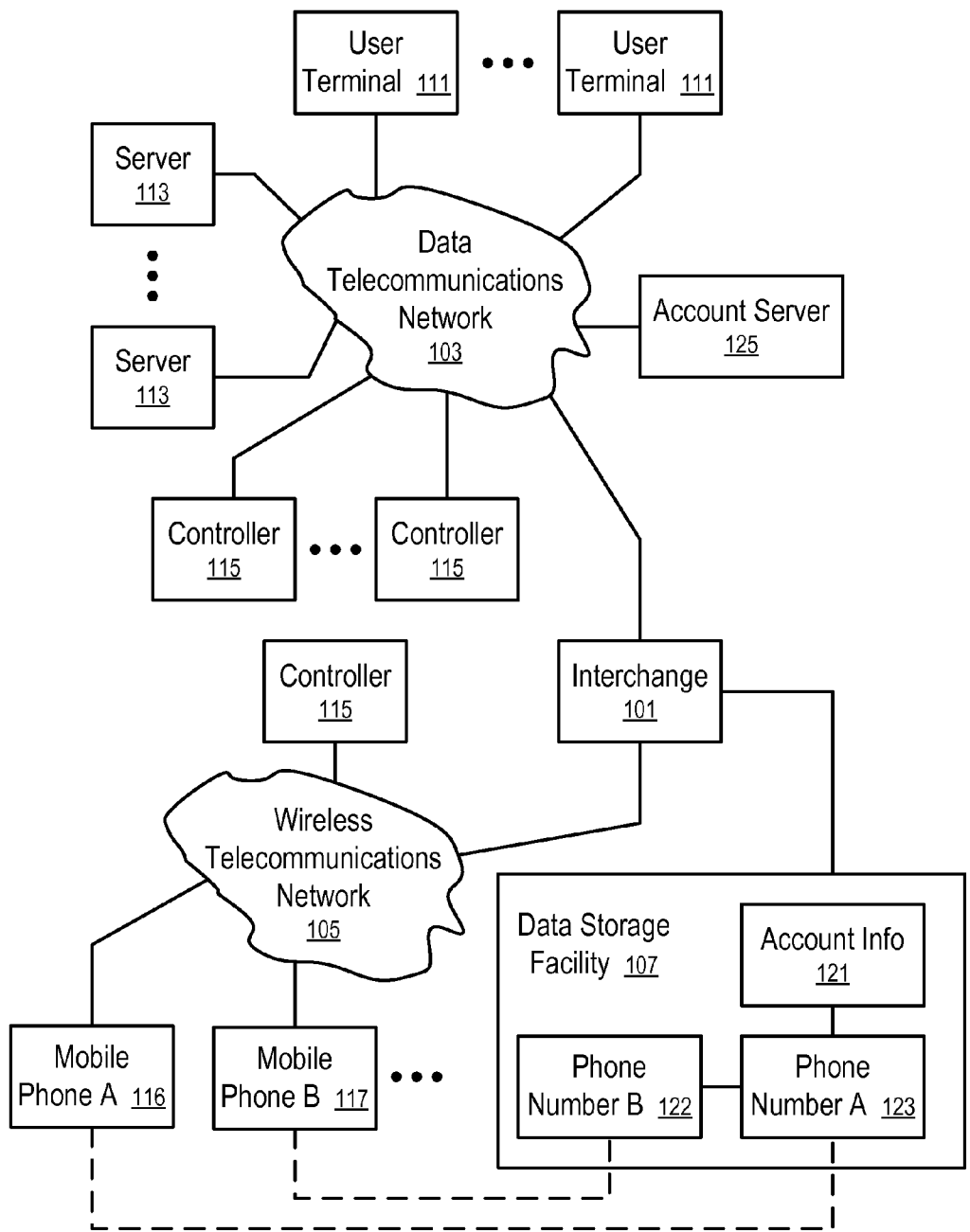
FIG. 1 shows a system to control online transactions according to one embodiment.

FIG. 1 shows a system to facilitate online transactions according to one embodiment. In FIG. 1, an interchange (101) is provided to interface with a plurality of different controllers (115) for communications with the mobile phones (e.g., 116, 117, etc.) over the wireless telecommunications network (105).

In FIG. 1, a data storage facility (107) stores user account information (121) and the corresponding phone number (123) of the mobile phone (116). The data storage facility (107) also stores data to associate the phone number (122) with the phone number (123). In FIG. 1, the mobile phone (117) can be reached at the phone number (122).

In one embodiment, different telecommunication carriers provide telecommunication services to the mobile phones (116 and 117). For example, the mobile phone (116) may be with a first telecommunication carrier in a first country; and the mobile phone (116) may be with a second telecommunication carrier in a second country different from the first country. In other embodiments, the same telecommunication carrier may provide telecommunication services to the mobile phones (116 and 117). In one embodiment, the controllers (115) are operated by the telecommunication carriers of the mobile phones (e.g., 116, 117, etc.)

FIG. 1 illustrates one group of mobile phones (116 and 117) that are associated with each other via the data in the data storage facility. However, a group may have more than two mobile phones; and the data storage facility may store data to associate multiple groups of mobile phones.

In FIG. 1, the interchange (101) is coupled with the data storage facility (107) to communicate with the mobile phone (117) at the corresponding phone number (122) to confirm purchases requests and to communicate with the mobile phone (116) at the corresponding phone number (123) to approve the purchase request, which is to be funded by the account associated with the phone number (123).

In one embodiment, the account information (121) includes the account numbers of financial accounts with banking systems, such as bank accounts, credit card accounts, debit card accounts, and others. Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In some embodiments, the funds for the purchase requests are collected via the phone bill of the mobile phone (123). For example, the interchange (101) may send a set of premium messages to the mobile phone (123) to collect the funds via the premium messages. Alternatively, the interchange (101) may request the mobile phone (123) to send a set of premium messages to the interchange (101) to provide the funds. Alternatively, the interchange (101) may communicate with the telecommunication carrier of the mobile phone (123) to charge an amount on the monthly phone bill of the mobile phone, or to deduct an amount from the prepaid amount of the mobile phone.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to approve and fund the purchases confirmed by the associated mobile phone (117). In some embodiments, the user of the mobile phone (116) may also directly confirm, approve and fund the purchases.

In FIG. 1, the user terminals (111) may use a unified interface to send requests to the interchange (101). The user terminals (111) are typically different from the mobile phones. However, in some embodiments, users may use the mobile phone (117) to access the web and submit the account information (121).

For example, a website of the interchange (101) may be used to receive the account information (121) and/or the indication of the association between the phone numbers (122 and 123) from the web browsers running in the user terminals (111). Alternatively, the users may use the mobile phone (117) to submit the account information (121) to the interchange (101) via text messaging, email, instant messaging, etc.

Alternatively, the indication of the association between the phone numbers (122 and 123) may be received from the mobile phone (116 or 117), or from the telecommunication carrier of the mobile phone (116 or 117) (e.g., when the mobile phones share a phone bill).

The use of the mobile phones (116 and 117) in the confirmation and approval of activities that involve the account information (121) increases the security of the transaction, since the mobile phones (116 and 117) are typically secured in the possession of the users.

For the convenience of the users, the interchange (101) may use the phone bills of the mobile phones (117) to pay for purchases in one embodiment, use the account information (121) to pay for the phone bills, and/or deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phone (116) via the phone number (123) stored in the data storage facility (107) and the mobile phone (117) is associated with the mobile phone (116) via the association between the phone numbers (122 and 123) in the data storage facility (107), the user of the mobile phone (117) may use the user terminal (111) to access online servers (113) of various merchants or service providers to make purchases and have the purchases funded by the user of the mobile phone (116).

For example, the user of the mobile phone (117) may confirm the purchase via the mobile phone (117). Once the purchase request is confirmed via the mobile phone (117), the user of the mobile phone (116) may approve the purchase request via the mobile phone (116). Once the purchase request is confirmed and approved, the interchange (101) may use the account information (121) to fund the purchase.

In one embodiment, when the user of the mobile phone (116) approves the purchase, the user may choose to use the accounts identified by the account information (121) to provide the funds for the purchases, without revealing their account information (121) to the operators of the servers (113). Alternatively, the user may choose to provide the funds via the phone bill of the mobile phone (116) (e.g., prepaid, or monthly bill).

For example, the user of the mobile phone (117) may use the user terminal (111) to provide the phone number (122) to the servers (113) and/or the interchange (101) to make a purchase. The interchange (101) sends a message to the mobile phone (117) via the phone number (122) to confirm the purchase request. Once the purchase is confirmed via the corresponding mobile phone (117), the interchange (101) sends a message to the mobile phone (116) based on the association of the phone numbers (122 and 123) in the data storage facility. Once the purchase is approved via the corresponding mobile phone (116), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) does not have to provide the phone number (122) to the server (113) to process the payment. The server (113) may redirect a payment request to the interchange (101), which then prompts the user terminal (111) to provide the phone number (122) to the website of the interchange (101) to continue the payment process.

For example, the server (113) may redirect the payment request to the website of the interchange (101) with a reference indicating the purchase made via the user terminal (111). The interchange (101) can use the reference to subsequently complete the payment with the server (113) for the purchase, after receiving the phone number (122) directly from the user terminal (111) to confirm the purchase via the mobile phone (117).

In some embodiments, instead of directly providing the phone number (122) to identify the account information (121), the user may provide other information to identify the phone number (122), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (116) via a secure connection.

Alternatively, the user of the mobile phone (116) may supply the account information (121) to the interchange (101) at the time of approving the payment request, after the purchase is confirmed via the mobile phone (117).

In one embodiment, once the account information (121) is associated with the phone number (123) in the data storage facility (107), the user does not have to resubmit the account information (121) in subsequent payment requests. The user of the mobile phone (116) may use a reference to the account information (121) to instruct the interchange (101) to use the account information (121) to collect the funds.

By delegating the payment task to the interchange (101) and securing the account information (121) in the data storage facility (107), the system as shown in FIG. 1 can increase the security of using the account information (121) in an online environment, while allowing the user of the mobile phone (116) to control and pay for the purchases made by others, such as the user of the mobile phone (117), without revealing the account information (121) to them.

In some embodiments, the interchange (101) can also fulfill the payment requests using the funds collected via the phone bill of the phone number (123). The interchange (101) can collect the funds via sending premium messages to the mobile phone (117) at the phone number (123), after receiving confirmation from the mobile phone (117).

For example, after the confirmation or approval message is received from the mobile phone (116), the interchange (101) performs operations to collect funds via the phone bill of the phone number (123). The interchange (101) may calculate the required premium messages to bill to the mobile phone (116). For example, mobile terminated premium SMS messages may have a predetermined set of prices for premium messages. The interchange (101) determines a combination of the premium messages that has a price closest to the amount required for the purchase, and sends this combination of premium messages to the mobile phone. For example, mobile originated premium SMS messages may also have a predetermined set of prices for premium messages. The interchange (101) can calculate the set of messages required for the purchase and transmit a text message to the mobile phone (116) of the user to instruct the user to send the required number of premium messages to provide the funds.

In one embodiment, the user of the mobile phone (116) can specify a set of restrictions that are applied to the purchase requests made by the users of the associated mobile phone (117). For example, the restrictions may include the allowable frequency of the purchases, the allowable types of purchases (e.g., the type of products or services purchased), the allowable spending limit for each purchase, a budget for a predetermined period of time (e.g., a month, a week, etc.), the allowable time period during a day for purchases, etc. Thus, a parent may use the restrictions to apply parental control of the purchase activities of a child. In one embodiment, the interchange (101) communicates with the mobile phone (117) for purchase confirmation, if the purchase satisfies the restrictions.

In one embodiment, the mobile phones (116 and 117) are used by the corresponding users to make payments and/or manage funds, such as for making purchases in various websites hosted on the servers (113) of merchants and service providers and/or for transfer funds to or from an account identified by the account information (121), such as phone bills of land-line telephone services, credit card accounts, debit card accounts, bank accounts, etc., or an account hosted on the data storage facility (107) or telecommunication accounts of the mobile phones (116 and 117) with telecommunication carriers. The mobile phones (116 and 117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone numbers (122 and 123)).

In one embodiment, the user of the mobile phone (116) may provide an advance approval for one or more anticipated purchases made by the users of the mobile phone (117). For example, the mobile phones (116 and 117) may be in different countries in different time zones; and the user of the mobile phone (116) may not be available to provide the approval when the user of the mobile (117) makes a purchase. Thus, the user of the mobile phone (116) may provide an advance approval with limitations, such as allowable amount/budget and expiration date, to avoid the delay in the approval of the purchases by the user of the mobile phone (117).

Figure 2:
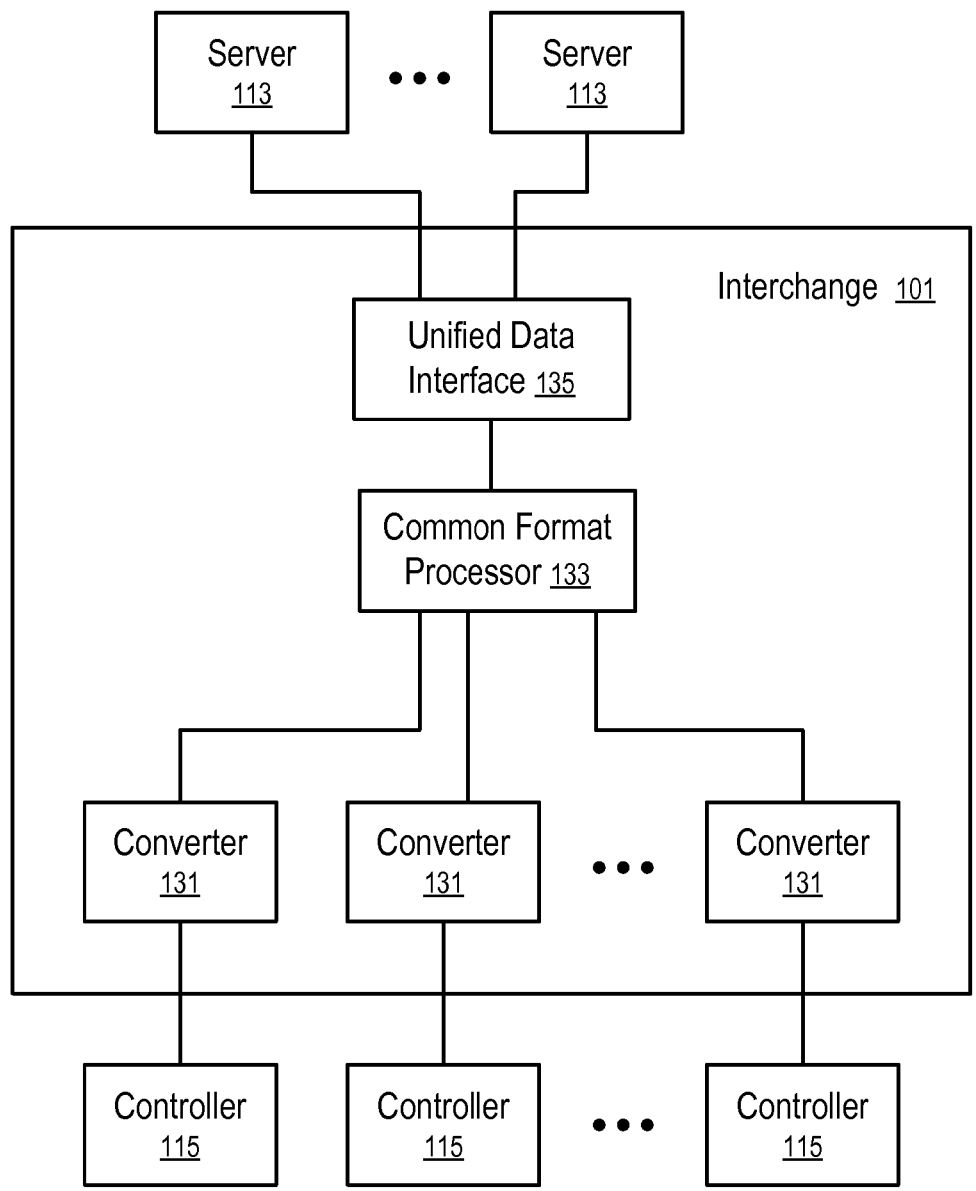
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
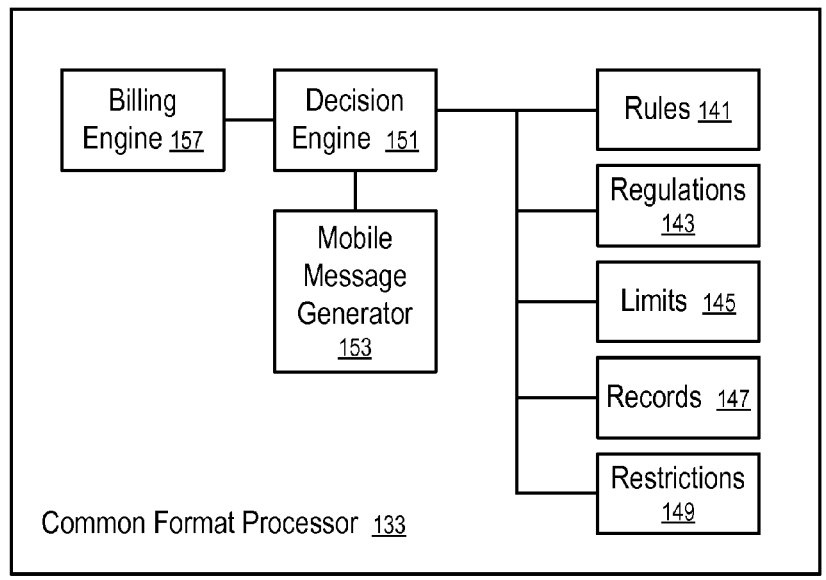
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (116) to bill the user, or requests the mobile phone (116) to send mobile originated premium SMS messages to a short code representing the interchange (101).

In one operator billing method, the interchange (101) directly sends a message to the mobile carrier of the mobile phone (116) to bill the amount on the phone bill of the mobile phone (116), without having to send a premium message to the mobile phone (116).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (116). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (116) about the transaction (e.g., a request to collect funds via the phone bill of the user for a payment request, or for deposit into an account identified by the account information (121)). The converter (131) then interfaces with the corresponding controller (115) to transmit the messages to the mobile phone (116).

FIGS. 4-7 show methods to control an online transaction using an interchange according to a plurality of embodiments.

Figure 4:
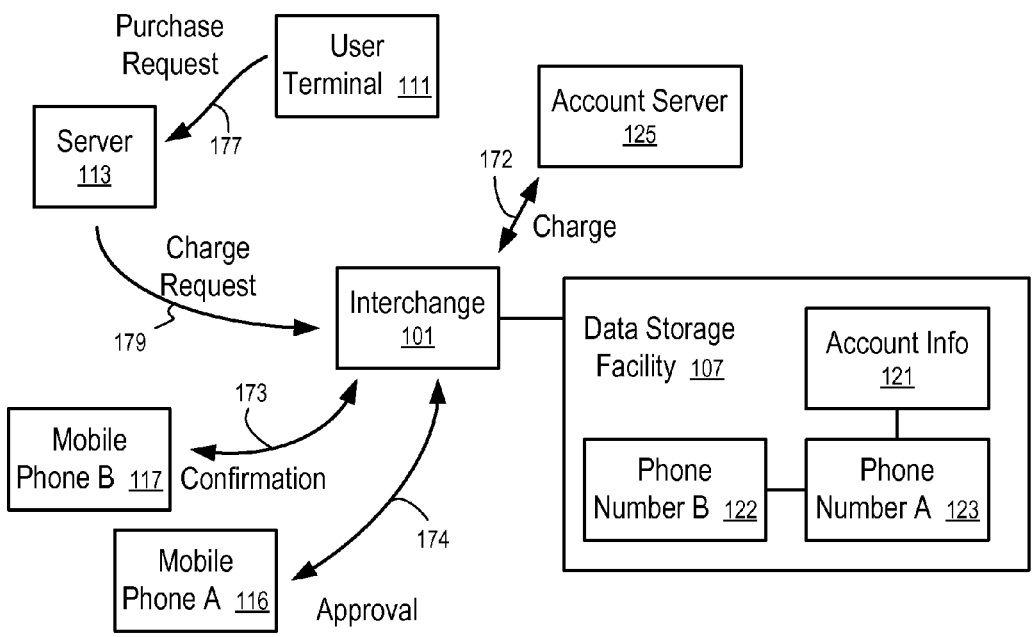
FIGS. 4-7 show methods to control an online transaction using an interchange according to a plurality of embodiments.

In FIG. 4, the user of the mobile phone (116) at the phone number (123) may provide account information (121) to the interchange (101) for association with the phone number (123). For example, the user may use a device running a web browser as the user terminal (111) to submit the account information (121) via a secure web connection. The user terminal (111) is typically different from the mobile phone (116). However, in some embodiments, the mobile phone (116) may also be used as the user terminal (111) to submit the account information (121) (e.g., via a wireless application protocol (WAP) application, or via a message sent via short message service (SMS) or multimedia message service (MMS), or via an email message or an instant message).

After the user of the mobile phone (116) provides the account information (121) to the interchange (101) for storage in the data storage facility (107), the user of the associated mobile phone (117) can send (177) a purchase request to the server (113) of a merchant from the user terminal (111). The users of the mobile phones (116 and 117) may use the same user terminal (111) or different user terminals.

In response to a purchase request from the user terminal (111), the server (113) of the merchant can send or redirect (179) the charge request to the interchange (101). In response to the charge request, the interchange (101) sends (173) a confirmation message to the mobile phone (117). If the user of the mobile phone (117) sends (173) a confirmation to the interchange (101), the interchange sends (174) a message to the mobile phone (116) for approval, since the data stored in the data storage facility (107) indicates that the purchases made by the user of the mobile phone (117) at the phone number (122) is to be funded by the user of the mobile phone (116) at the phone number (123). If the user of the mobile phone (116) approves the request, the interchange (101) communicates with the account server (125) to charge an account identified by the account information (121), without revealing the account information (121) to the server (113). The interchange (101) pays the merchant on behalf of the user using the funds collected via charging the account of the user of the mobile phone (116). For example, the interchange (101) may use its own bank account to pay the merchant operating the server (113). Thus, the financial information of the user is not revealed to the merchant.

Upon the completion of the payment process, the interchange (101) can notify the mobile phone (117), the mobile phone (116) and/or the user terminal (111).

In some embodiments, the server (113) of the merchant redirects the charge request to allow the user terminal (111) to communicate with the interchange (101) to continue the payment process; and the user terminal (111) may provide (171) the phone number (122), or both the phone numbers (122 and 123), directly to the interchange (101) to request the interchange (101) to process the payment for the transaction, after the charge request is redirected.

In alternative embodiments, the user of the mobile phone (116) may provide the account information (121) from the mobile phone (116) together with the approval of the purchase request.

In one embodiment, the interchange (101) communicates with the mobile phone (117) for the confirmation of the charge request via SMS messages. Alternatively, the confirmation communications can be sent (173) via emails, instant messages, voice message, live calls from operators, etc.

In one embodiment, the interchange (101) communicates with the mobile phone (116) for the approval of the charge request via SMS messages. Alternatively, the approval communications can be sent (173) via emails, instant messages, voice message, live calls from operators, etc.

In some embodiments, the confirmation communications may include only a one-way message from the interchange (101) to the mobile phone (117) or from the mobile phone (117) to the interchange (101). For example, the interchange (101) may provide a code (e.g., a one time code with an expiration time limit) to the mobile phone (117) and the user may be required to provide the code back to the interchange (101) via the user terminal (111) to confirm the request. For example, the interchange (101) may provide the code to the user terminal (111) to request the code back from the mobile phone (117) to confirm the request.

Similarly, the approval communications may include only a one-way message from the interchange (101) to the mobile phone (116) or from the mobile phone (116) to the interchange (101). For example, the interchange (101) may provide a code (e.g., a one time code with an expiration time limit) to the mobile phone (116) and the user may be required to provide the code back to the interchange (101) via the user terminal (111) to confirm the request. For example, the interchange (101) may provide the code to the user terminal (111) to request the code back from the mobile phone (116) to confirm the request.

In some embodiments, the interchange may provide the code representing the transaction to the mobile phone (117) and request the code back from the mobile phone (116) to confirm and approve the transaction. In some embodiments, the interchange may provide the code representing the transaction to the mobile phone (116) and request the code back from the mobile phone (117) to confirm and approve the transaction. The users of the mobile phones (117 and 116) may communicate with each other via any communication links to allow the code be reported back to the interchange (101). For example, the users of the mobile phones (116 and 117) may forward the code via SMS, emails, instant messages, voice message, or live calls, etc.

Figure 5:
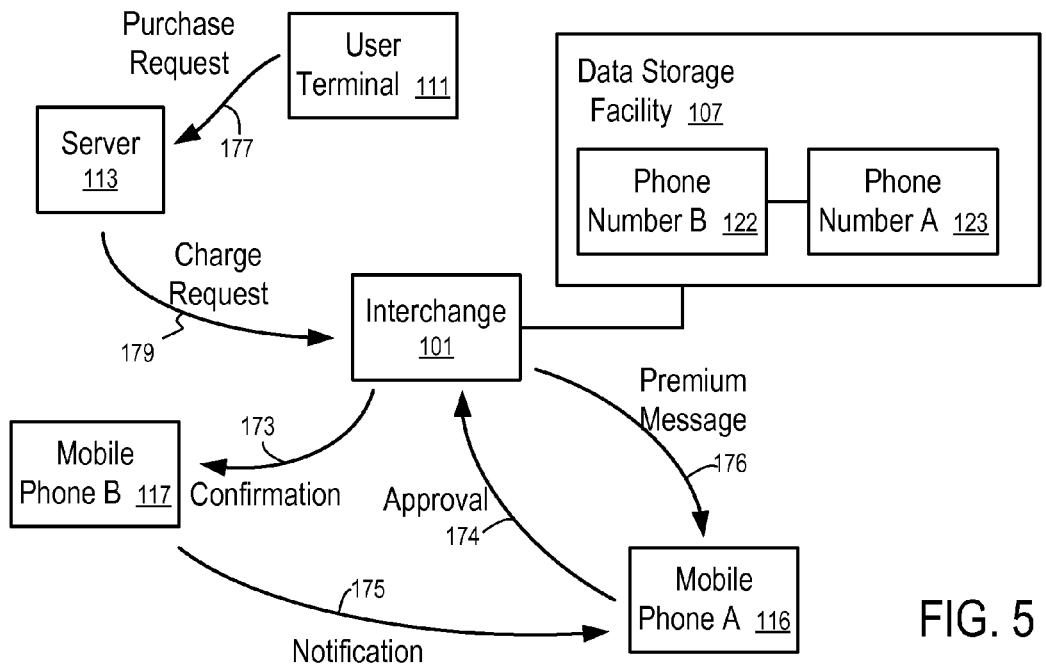

In some embodiments, the user of the mobile phone (117) may choose to fulfill the charge request via the phone bill, instead of charging the account identified by the account information (121), as illustrated in FIG. 5.

In FIG. 5, after the interchange (101) sends (173) a confirmation code to the mobile phone (117), the user of the mobile phone (117) provides (175) the code to the mobile phone (116) via a notification message (e.g., via SMS, emails, instant messages, voice message, live calls, etc.). The user of the mobile phone (116) then provides (174) the confirmation code to the interchange (101) to approve the transaction.

In FIG. 5, after receiving the approval from the mobile phone (116), the interchange (174) sends (176) a set of premium messages to the mobile phone (116) to collect funds via the telecommunications carrier of the mobile phone (116).

Figure 6:
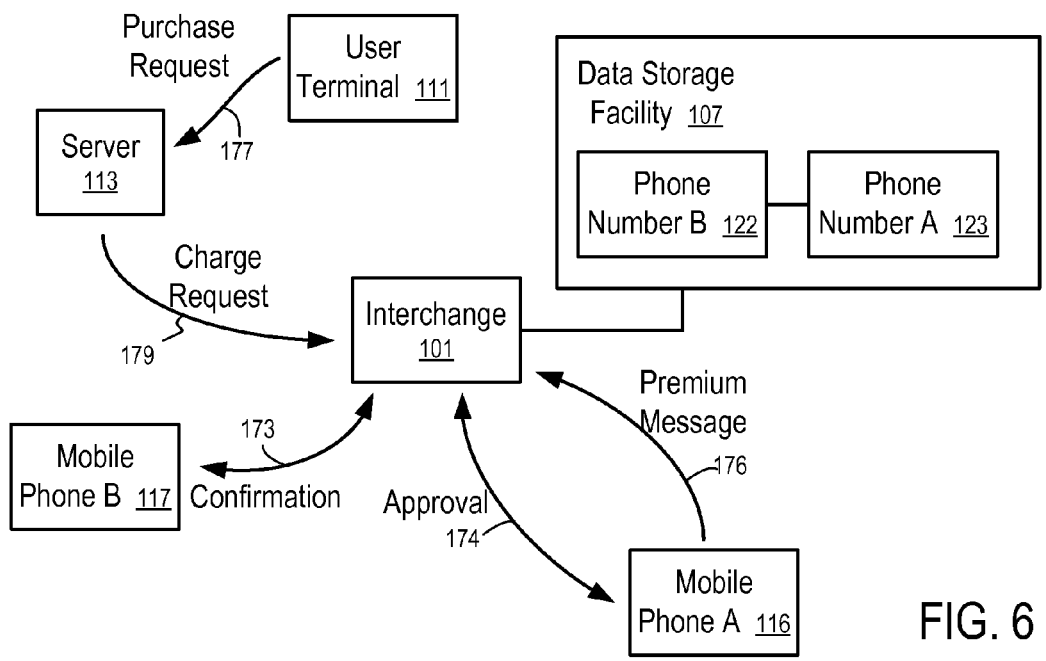

Alternatively, the interchange (101) may request the mobile phone (116) to send (176) a set of premium messages from the mobile phone (176) to collect the funds for the purchase request, as illustrated in FIG. 6. In some embodiments, the set of premium messages includes the approval message sent from the mobile phone (116) to the interchange (101). In FIG. 6, the interchange (101) separately communicates with the mobile phone (117) of the purchaser and the mobile phone (116) of the approver/payer for confirmation and for approval.

In some embodiments, the interchange (101) obtains the approval from the mobile phone (116) of the approver/payer prior to obtaining confirmation from the mobile phone (117) of the purchaser. In some embodiments, the interchange (101) obtains the confirmation from the mobile phone (117) of the purchaser prior to obtaining the approval from the mobile phone (116) of the approver/payer. In other embodiments, the interchange (101) sends (173 and 174) messages to both the mobile phones (116 and 117) prior to receiving replies from any of the mobile phones (116 and 117).

Figure 7:
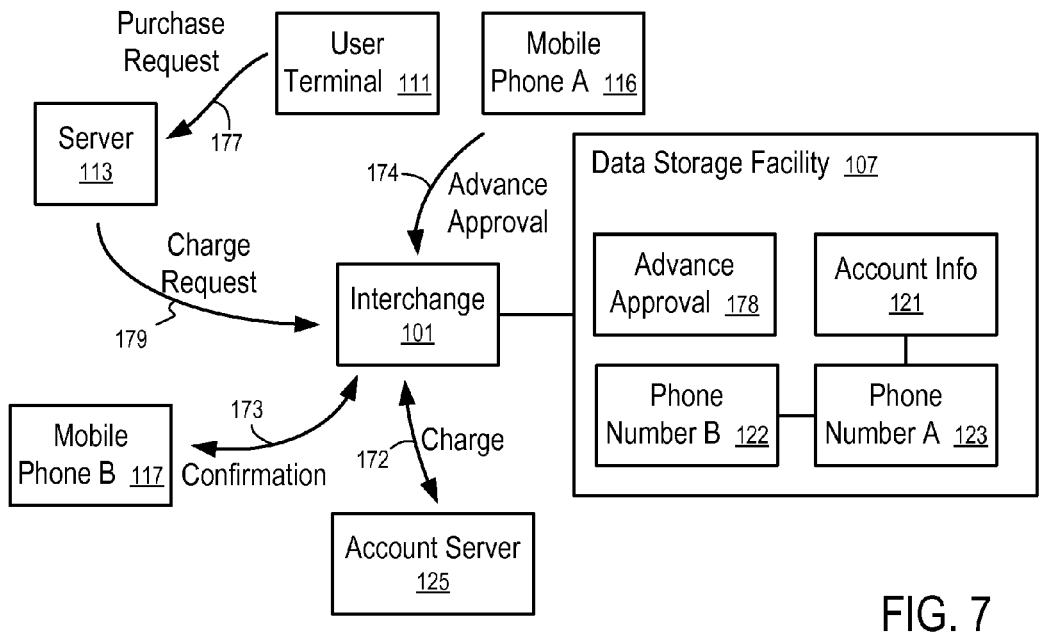

FIG. 7 illustrates an example of an advanced approval from the mobile phone (116) of the approver/payer. After the mobile phone (116) sends (174) an advance approval to the interchange (101), the data storage facility (107) stores data indicating the advance approval (178), which may include a budget limit, an expiration date, and a reference to the phone number (122) associated with the phone number (123) of the mobile phone (116). When the charge request (179) is received (179) from the server (113) of the merchant (or from the user terminal (111)), the interchange (101) communicates (173) with the mobile phone (117) to confirm the request, if the request meets the limitations of the advance approval (178).

FIGS. 8-11 show interfaces to obtain information of related telephone numbers according to a plurality of embodiments.

Figure 8:
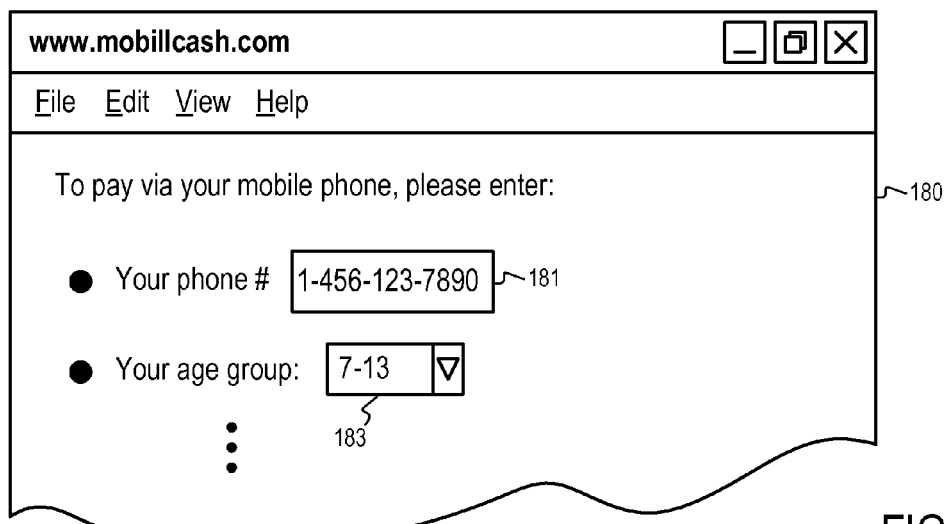
FIGS. 8-11 show interfaces to obtain information of related telephone numbers according to a plurality of embodiments.
Figure 9:
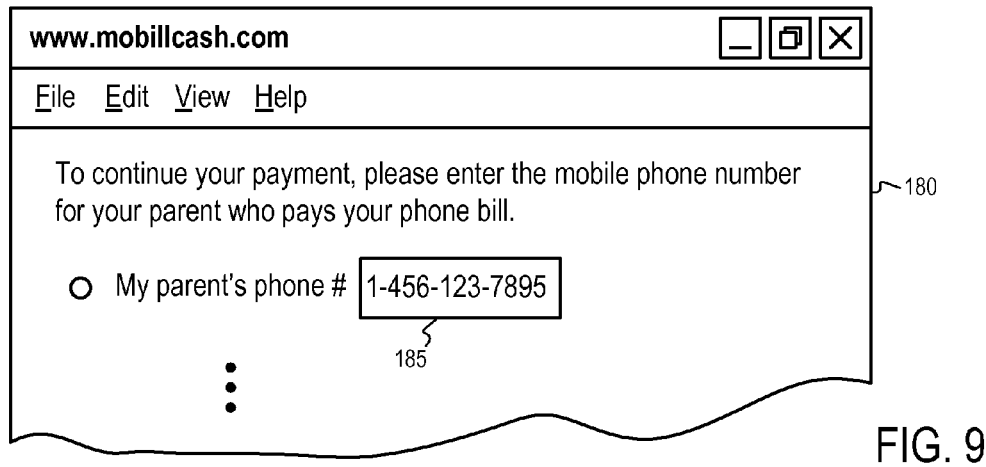

In FIG. 8, the user interface (180) (e.g., presented on the user terminal (111) or the mobile phone (117)) prompts the user to provide the phone number (122) in the input box (181) and to provide an indication of the age of the user in the selection box (183). If it is determined that the user is a child under an age limit, the user interface illustrated in FIG. 9 is presented to require the user to provide the phone number (123) of the parent in the entry box (185). Once the child user provides the phone number (123) of the parent, the data storage facility (107) stores data to associate the phone number (122) of the child with the phone number (123) of the parent and an indication that the funds for the purchases made by the child come from the parent at the phone number (123).

In one embodiment, the server (113) presents the user interface (180) via an online shopping cart system or a third party checkout system. Alternatively or in combination, the server (113) presents the user interface (180) via a web widget. For example, a web widget may include a program code that is portable and executable within a web page without requiring additional compilation. The web widget allows the user to interact with the user interface (180) to pay for the product and/or service without leaving the web page or refreshing the web page. In one embodiment, the interchange (101) provides the web widget to facilitate the payment processing.

Figure 10:
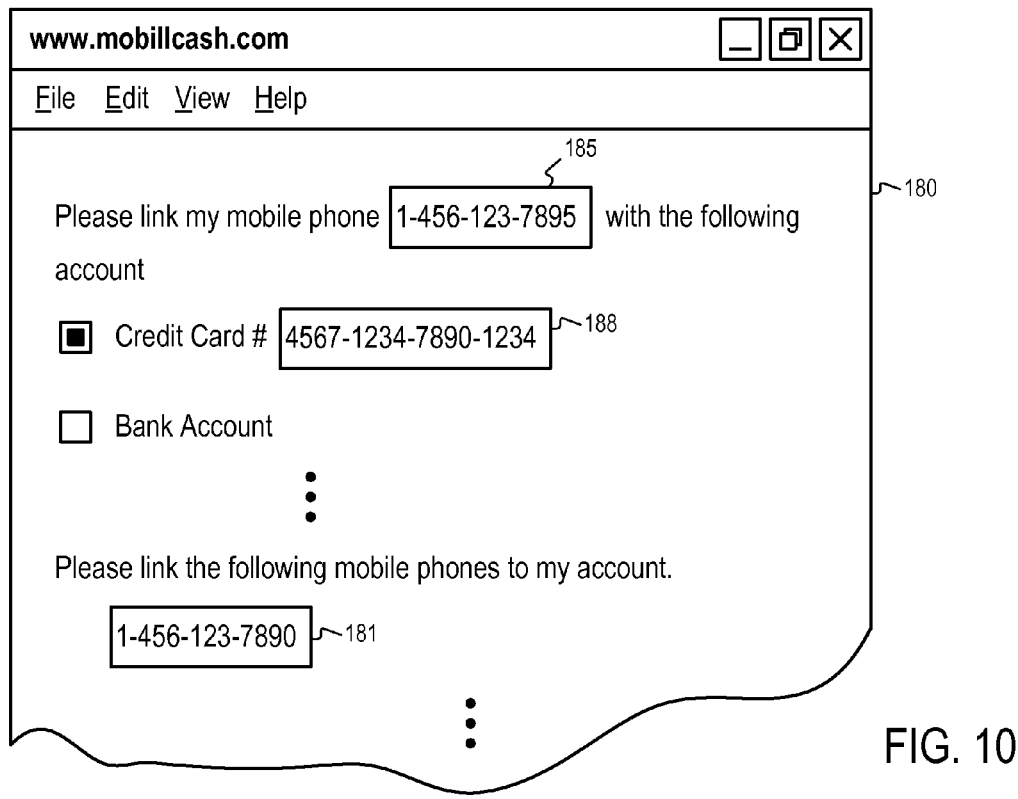

In FIG. 10, when the user of the mobile phone (116) provides the phone number (123) in the entry box (185) to associate the phone number (123) with the account information (121) provided within the entry box (188), the user interface (180) allows the user to link the phone number (123) with one or more phone numbers specified in the input box (181). If the user links the phone numbers (122 and 123) via the user interface (180) illustrated in FIG. 9, the data storage facility (107) allows the user of the mobile phone (117) at the phone number (122) to fund purchases using the account information (121) provided via the entry box (188). The interchange (101) is then configured to communicate with the mobile phone (116) at the phone number (123) provided in the entry box (185) for approval of the purchases made by the user of the associated mobile phone (117).

FIG. 10 illustrates the example of specifying a credit card number in the entry box (188) as the account information (121). Alternatively or in combination, the user interface (180) may allow the user to specify one or more of various other types of accounts, such as bank accounts, charge card accounts, etc.

In some embodiments, the user interface (180) may further present a text field (not shown in FIG. 10) to allow the user to specify an alias for the account information (121) supplied in the text input field (181). For enhanced security, the alias can be used for subsequent communications with the user to select one account from a plurality of accounts without revealing the account information (121).

In FIG. 10, the user interface (180) may be presented via a web browser (or a custom application) to submit account information (121) from a user terminal (111) to the interchange (101). Alternatively, the account number can be submitted from the mobile phone (116) via a message sent via SMS, WAP, voice mail, or via an interactive voice response (IVR) system.

Figure 11:
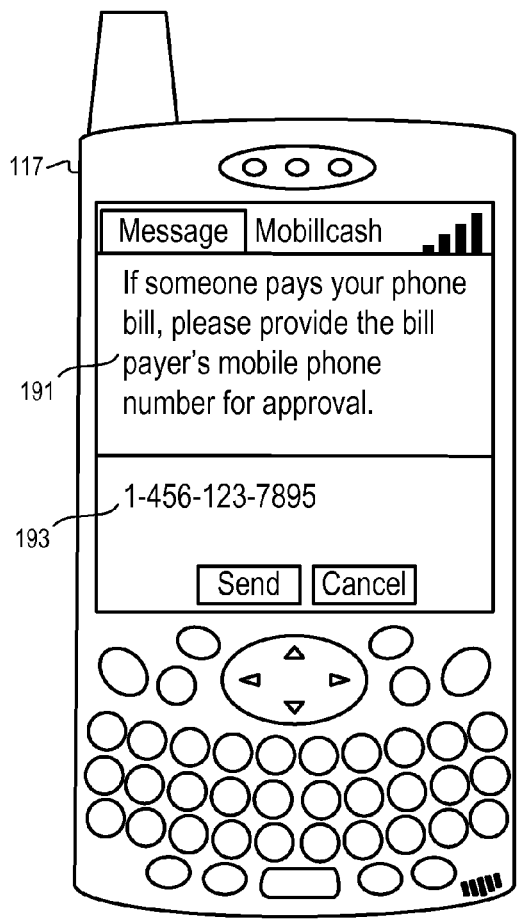

FIG. 11 illustrates the mobile phone (117) of a child prompting the child to provide a phone number of the parent of the child. For example, after the child initiates a purchase request with the phone number (122) of the mobile phone (117) operated by the child, the interchange (101) may prompt the child to provide the phone number (123) of the parent. After the child provides the phone number (123) of the parent, the interchange (101) can communicate with the mobile phone (117) of the parent for approval and billing.

In some embodiments, the mobile phone (117) of the child is used to prompt for the phone number of the parent, when the child registers with the interchange (101). The interchange (101) provides the message to the mobile phone (117) to confirm that the user is in possession of the mobile phone (117) at the phone number (122) and to prompt the user for the phone number of the person who pays the phone bill of the mobile phone (117).

In some embodiments, a user of the mobile phone (117) may also request the interchange (101) to link the phone number (122) with the phone number (123) of a family member, a relative, or a friend who is willing to fund some purchases made by the user. Thus, the relationship between the users of the mobile phones (116 and 117) is not limited to the child and parent relationship.

Figure 12:
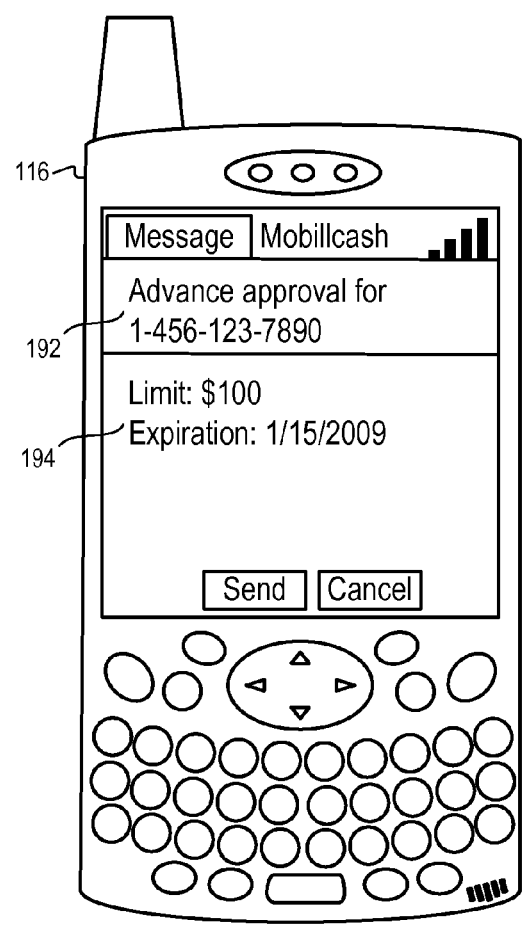
FIG. 12 illustrates a user interface to provide advance approval according to one embodiment.

FIG. 12 illustrates a user interface to provide advance approval according to one embodiment. In FIG. 12, the user of the mobile phone (116) provides a message (194) to approve one or more future purchases requests initiated by the user of the mobile phone (117).

In one embodiment, the advance approval is in response to a request from the mobile phone (117). The interchange (101) sends a message (192) to the mobile phone (116), in response to the request for advance approval from the mobile phone (117). The message (192) identifies the phone number (122) of the mobile phone (117); and the advance approval message (194) includes restrictions, such as a budget limit, an expiration limit of the advance approval, etc. Other restrictions may include the location and time of the purchase, the type of products and services to be purchased, the maximum number of purchase requests, the frequency of purchase requests, etc.

In some embodiments, the user of the mobile phone (116) at the phone number (123) may directly send a message to interchange (101) provide the advance approval for the phone number (122), without a corresponding incoming message from the interchange (101). For example, the users of the mobile phones (116 and 117) may communicate with each other to identify the need for the advance approval, prior to the user of the mobile phone (116) sending the advance approval to the interchange (101).

Figure 13:
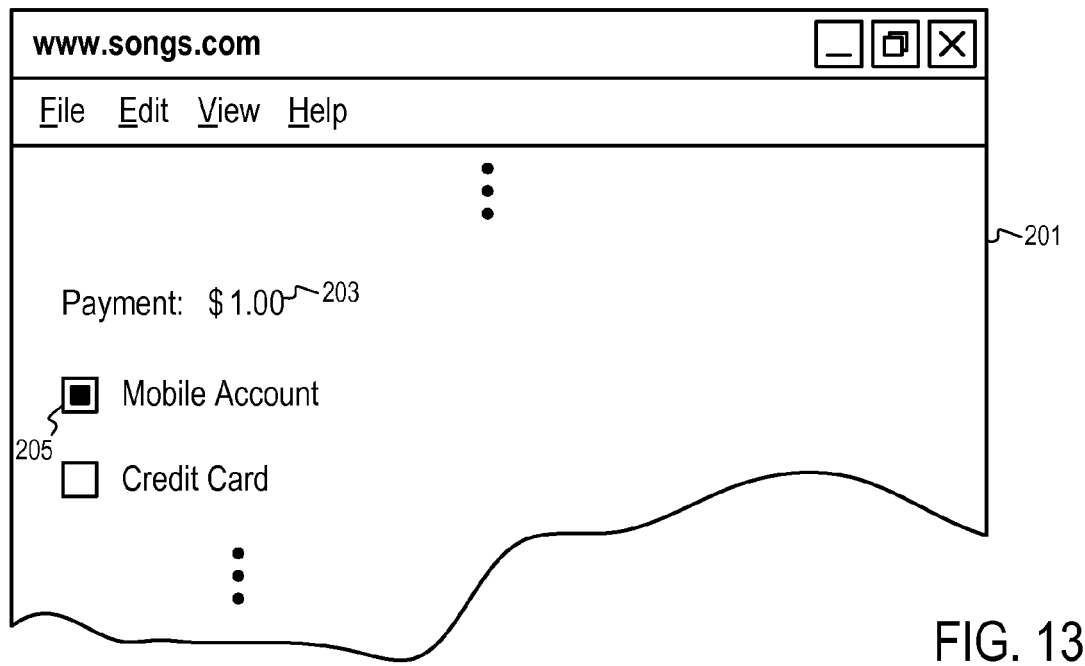
FIG. 13 illustrates a user interface to initiate a payment transaction according to one embodiment.

FIG. 13 illustrates a user interface to initiate a payment transaction according to one embodiment. In FIG. 13, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the website of the interchange (101) to complete the payment.

Figure 14:
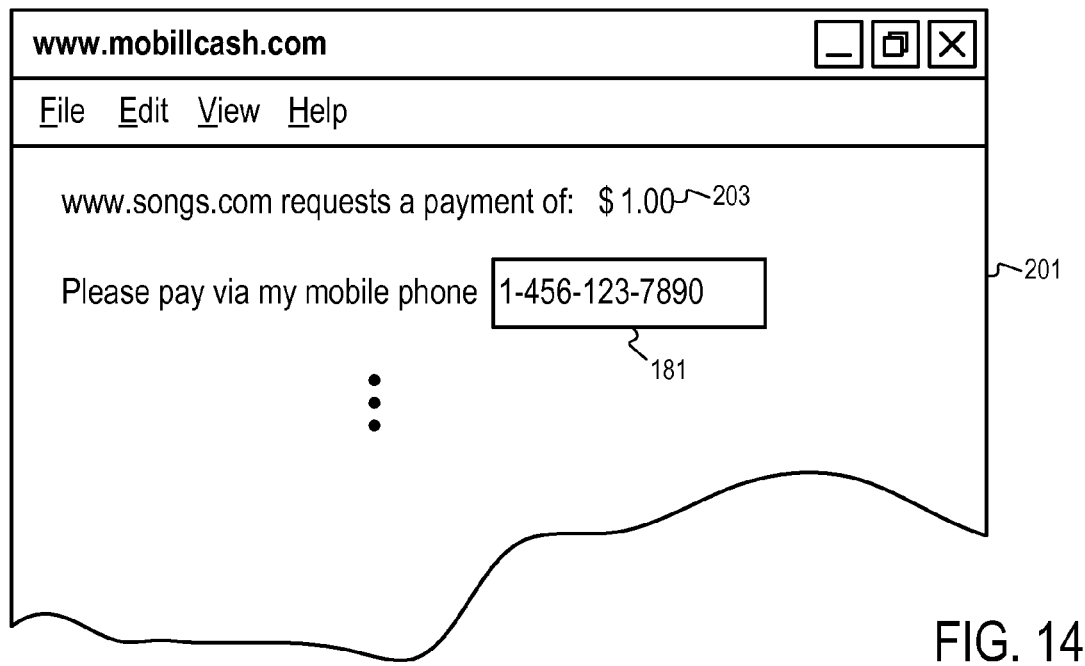
FIG. 14 illustrates a user interface to initiate a payment request according to one embodiment.

FIG. 14 illustrates a user interface to initiate a payment request according to one embodiment, after the payment request is redirected to the website of the interchange (101). In FIG. 14, the user interface (201) includes the identity of the merchant and the amount (203) of the requested payment. The user interface (201) includes a text field (181) to allow the user to provide the phone number (122) of the mobile phone (117) to confirm the purchase request.

Further, user authentication may be used to reduce false messages to the phone number (122). For example, the user interface (201) may request a personal identification number (PIN) for enhanced security. For example, the user may be required to register with the interchange (101) prior to using the services of the interchange (101); and after registering with the interchange (101), the user is provided with the PIN or can created a customized PIN to access the functionality provided by the user interface (201).

Alternatively, the user interface (201) may request an identifier associated with the phone number (122) to initiate the payment transaction. In some embodiments, the user interface (201) requires the user to provide no information other than the phone number (122) in the text field (181) to initiate the transaction. In some embodiments, the user interface (201) provides a list of options for the user at the phone number (122) to fund the purchases, such as credit cards or bank accounts associated with the phone number (122), or accounts associated with the phone number (123).

In some embodiments, the user interface (201) may present the payment options after authenticating the user (e.g., via a personal identification number or password) for enhanced security.

In one embodiment, once the user submits the payment request via the user interface (201), the interchange (101) transmits a confirmation message to the mobile phone (112) according to the phone number (122) provided in the text field (181). In one embodiment, the interchange (101) transmits the confirmation to the mobile phone (116) after the user is authenticated via the user interface (201) to reduce the possibility of unauthorized/unwelcome messages to the mobile phone (116), which may occur when the user intentionally or unintentionally provides an unrelated phone number in the entry box (181).

Figure 15:
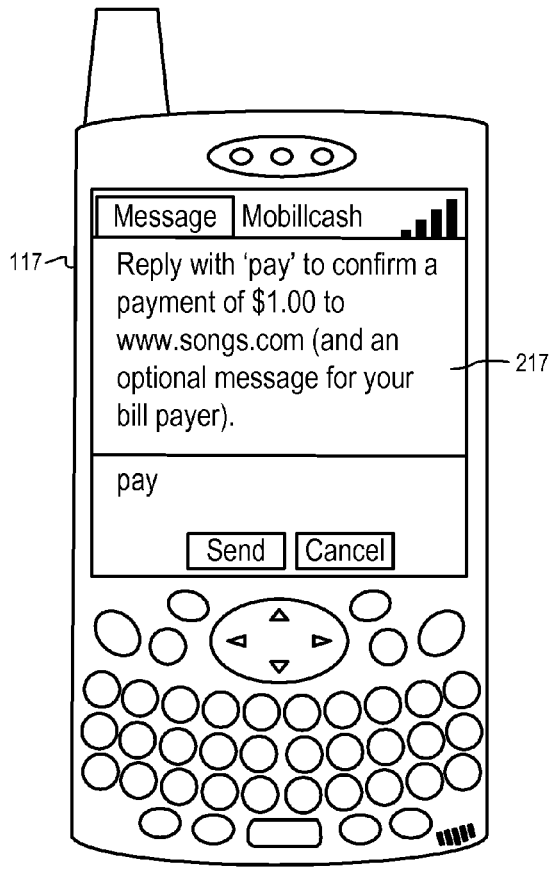
FIG. 15 illustrates a user interface to confirm a payment request according to one embodiment.

FIG. 15 illustrates a user interface to confirm a payment request according to one embodiment. In FIG. 15, the confirmation message (217) from the interchange (101) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 15.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the phone number (122), and/or a code (not shown) randomly generated and presented in the user interface used to initiate the payment transaction (e.g., user interface (201)).

In some embodiments, the code requested in the text message (217) may be a personal identification number (PIN) associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 14). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

In one embodiment, the user of the mobile phone (117) may optionally provide a message with the code to the interchange (101). The interchange (101) then relays the message to the mobile phone (116) to assist the approval decision making at the mobile phone (116).

Figure 16:
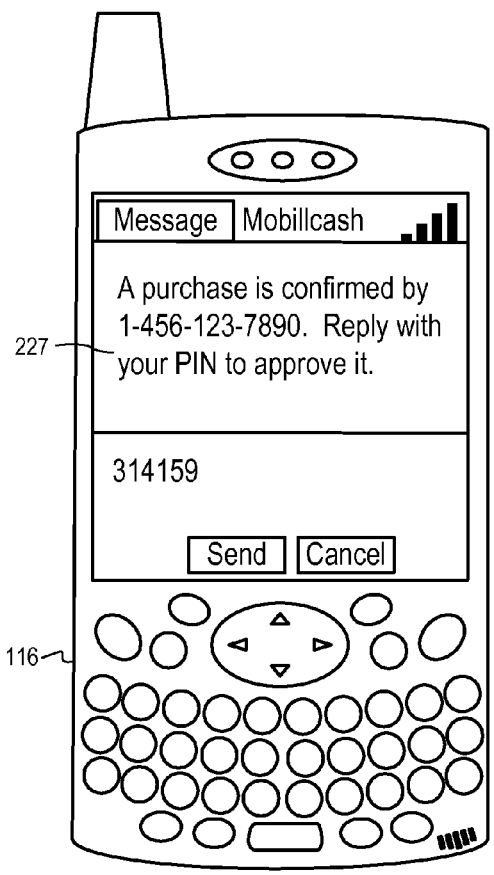
FIG. 16 illustrates a user interface to approve a confirmed payment request according to one embodiment.

FIG. 16 illustrates a user interface to approve a confirmed payment request according to one embodiment. In one embodiment, the interchange (101) sends a message (227) to the mobile phone (116) at the phone number (123), based on the association relationship between the phone numbers (122 and 123). The message (227) requests approval of a purchase made by the user of the mobile phone (117). The interchange (101) confirms the identity of the purchaser via the communications with the mobile phone (117), as illustrated in FIG. 15.

In FIG. 16, the approval request message (227) requests a code, such as a PIN associated with the phone number (123).

Alternatively or in combination, the approval request (227) may include a code provided in the message (227) and/or the code provided to the user of the mobile phone (117) for the purchase transaction.

In one embodiment, if the user of the mobile phone (117) provides the optional message in the confirmation reply to the interchange (101), the approval request message (227) also includes a copy of the optional message to assist the user of the mobile phone (116) in deciding whether or not to approve the purchase.

In some embodiments, the user of the mobile phone (116) may optionally provide the account information (121) to provide the funds for the purchase.

In one embodiment, after the purchase is confirmed and approved via the communications with the mobile phones (117 and 116), the interchange (101) communicates with the account server (125) to electronically charge the user of the mobile phone (116) using the associated account information (121) and pays the payee using the funds collected via communicating with the account server (125). Alternatively, the interchange (101) may send premium messages to the mobile phone (116) to collect the funds via the telecommunication carrier of the mobile phone (116), request premium messages from the mobile phone (116), or communicate with the telecommunication carrier of the mobile phone (116) to collect the funds via the phone bill of the mobile phone (116).

In some embodiments, the interchange (101) notifies the users when the payment transaction is complete.

For example, the interchange (101) may notify the user of the mobile phone (117) and/or the user of the mobile phone (116) via a text message. Once the payment transaction is complete, the user would have access to the product purchased via the payment transaction.

In one embodiment, the interchange (101) stores an address of the user associated with the phone number (122). After the completion of the payment transaction, the interchange (101) provides the address to the server (113) of the merchant for the delivery of the purchased product. In some embodiments, the user of the mobile phone (117) may provide multiple addresses associated with the phone number (122) and may select one as a delivery address in the confirmation message to the interchange (101). Alternatively, the interchange (101) may receive an address for product delivery from the mobile phone (117) together with the confirmation message and then forward the address to the server (113) of the merchant. Thus, the shipping address of the transaction is verified to be associated with the mobile phone (117). In alternative embodiment, the user may directly provide the shipping address in the website hosted on the server (113) of the merchant.

In some embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 17:
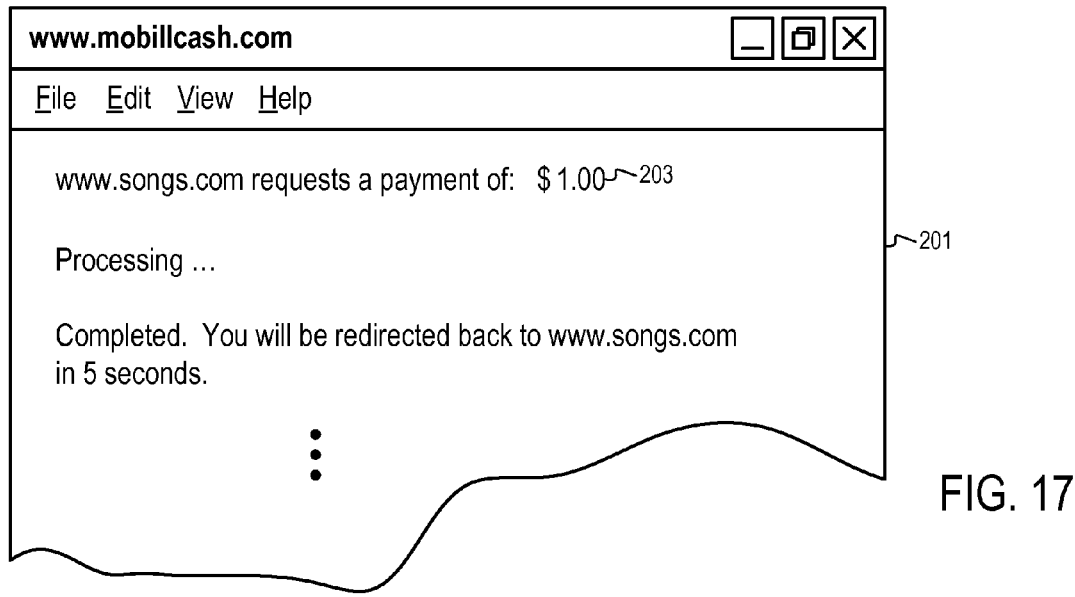
FIG. 17 illustrates a way to redirect a payment confirmation according to one embodiment.

FIG. 17 illustrates a way to redirect a payment confirmation according to one embodiment. For example, after the user submits the payment request to the interchange (101) via the user interface (201) shown in FIG. 14 (or FIG. 9), the interchange (101) may present the user interface (201) illustrated in FIG. 17 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the confirmation and approval from the users are required within a predetermined period of time of the request. If the user fails to provide the confirmation from the mobile phone (117), or the approval from the mobile phone (116), within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 18:
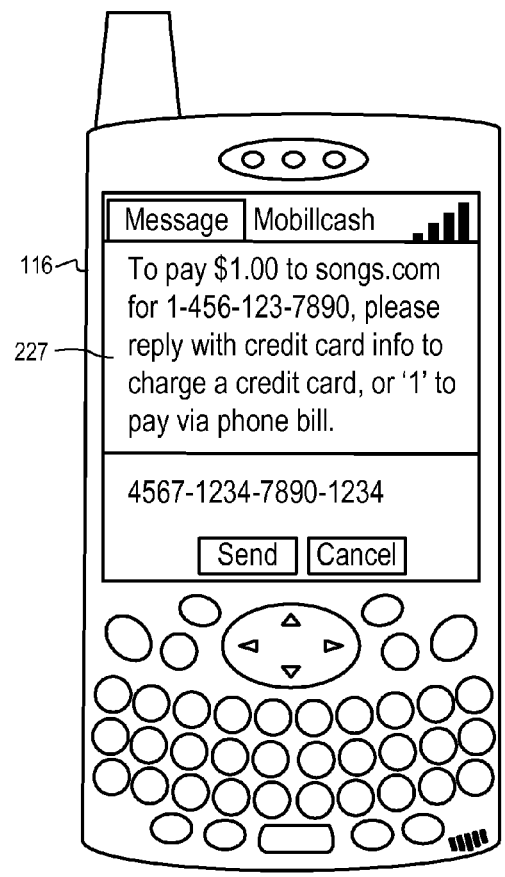
FIG. 18 illustrates a user interface to receive payment options according to one embodiment.

FIG. 18 illustrates a user interface to receive payment options according to one embodiment. In FIG. 18, the interchange (101) sends a message (227) to the mobile device (116) to provide a number of options to the user. The message (227) identifies the amount (203) of the requested payment and the identity of the payee (e.g., a merchant operating the server (113)) and asks the user to approve the payment request via a reply that contains a selected payment option.

In FIG. 18, the user may reply with the code "1" to approve the payment request and to pay via the phone bill of the mobile device (116). Alternatively, the user may reply with the credit card information to charge the payment to a credit card, as illustrated in FIG. 18.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.). Thus, each of the accounts can be identified to the user via the account type in the confirmation message, without revealing the details of the account information.

For example, the interchange (101) may combine the name of the financial institutions and the type of accounts to generate aliases for the account information.

In some embodiments, the user may define the aliases for the account information by supplying the aliases with the account information (121) for association with the phone number (123).

Figure 19:
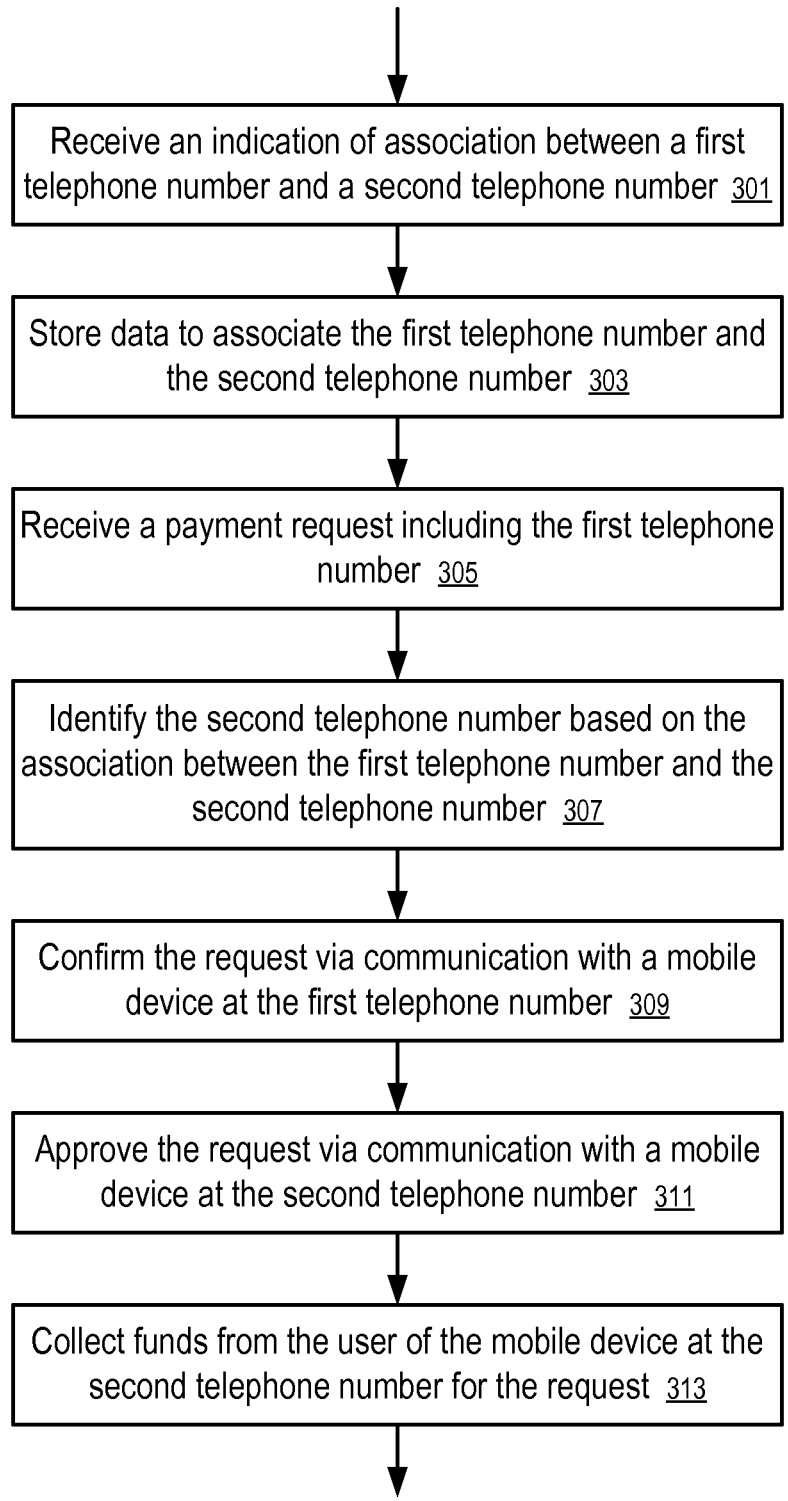
FIG. 19 shows a method to control an online payment according to one embodiment.

FIG. 19 shows a method to control an online payment according to one embodiment. In FIG. 19, the interchange (101) receives (301) an indication of association between a first telephone number and a second telephone number. The interchange (101) stores (303) data in the data storage facility (107) to associate the first telephone number and the second telephone number.

After the interchange (101) receives (305) a payment request including the first telephone number, the interchange (101) identifies (307) the second telephone number based on the association between the first telephone number and the second telephone number. The interchange (101) communicates with a mobile device at the first telephone number to confirm (309) the request and communicates with a mobile device at the second telephone number to approve (311) the request.

After the confirmation and approval of the purchase, the interchange (101) collects funds from the user of the mobile device at the second telephone number for the request.

Figure 20:
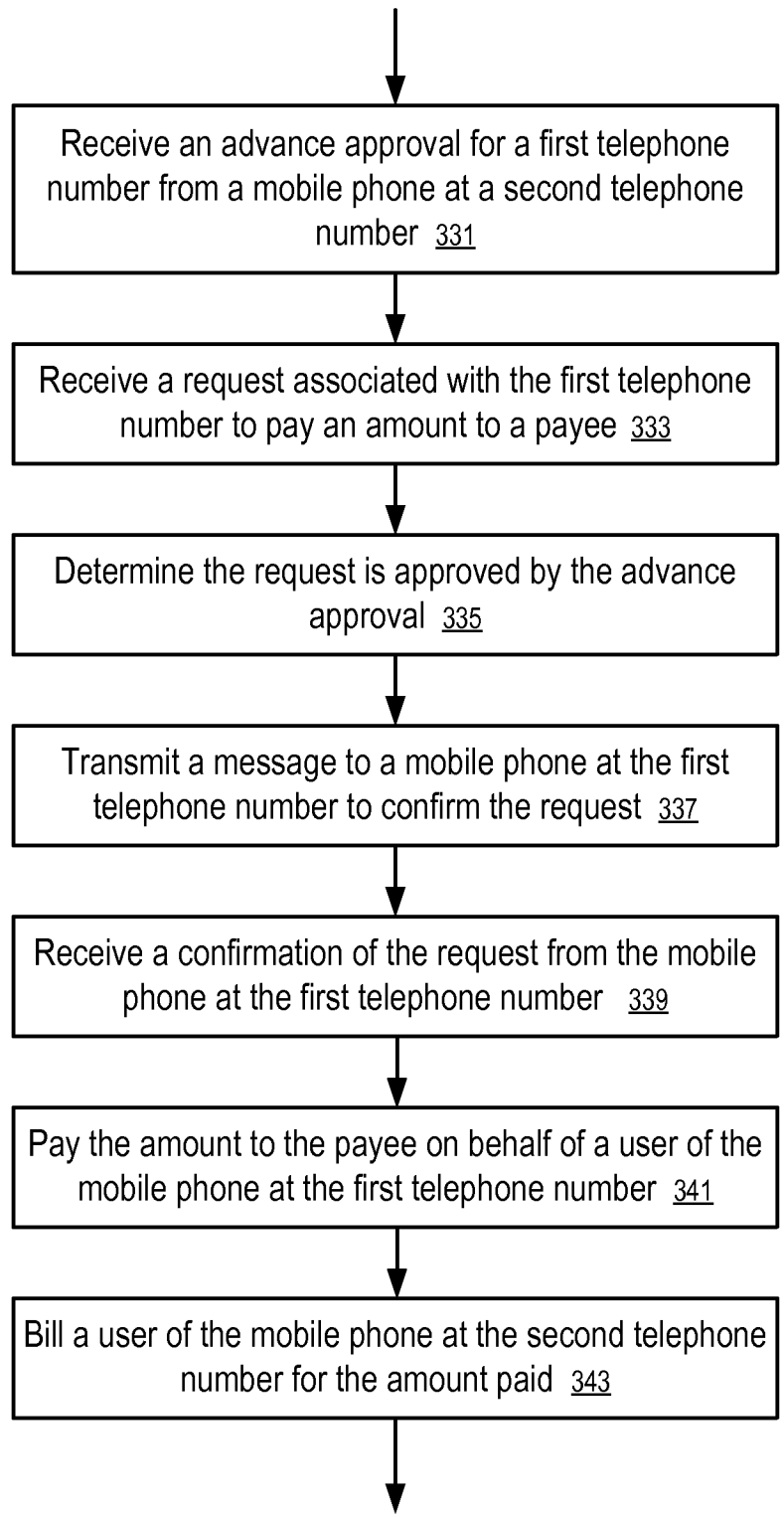
FIG. 20 shows another method to facilitate a payment transaction according to one embodiment.

FIG. 20 shows another method to facilitate a payment transaction according to one embodiment. In FIG. 20, the interchange (101) receives (331) an advance approval for a first telephone number from a mobile phone at a second telephone number. Subsequently, the interchange (101) receives (333) a request associated with the first telephone number to pay an amount to a payee. If the interchange (101) determines (335) the request is approved by the advance approval, the interchange (101) transmits (337) a message to a mobile phone at the first telephone number to confirm the request. If the interchange (101) receives (339) a confirmation of the request from the mobile phone at the first telephone number, the interchange (101) pays (341) the amount to the payee on behalf of a user of the mobile phone at the first telephone number and bills (343) a user of the mobile phone at the second telephone number for the amount paid.

In one embodiment, the interchange (101) bills the user of the mobile phone at the second telephone number for an amount equals to the purchase price plus a first fee and charges the merchant a second fee. In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., the fees charged by the telecommunication carrier for collecting the funds via the mobile phone bill associated with the telephone number and/or the fees charged by the interchange (101) for processing the payments). Since the first fee is charged to the customer (e.g., the payer of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, the interchange (101) is configured to provide services to obtain parental consent via mobile phones (e.g., 116) on behalf of third parties, such as social networking websites and online gaming sites. For example, when involving users under a certain age, certain online and/or offline activities may require parental consent (e.g., as required by law, merchant and/or parent). Examples of such activities include collecting personally identifiable data from the underage users, completing online purchases, accessing content in certain categories, participating in a gathering, a party or a trip, receiving an online or offline service, adding a service to a phone plan, making certain types of calls (e.g., international), and purchasing an application for a mobile phone. In one embodiment, the parental consent services of the interchange (101) can be used in connection with any activities that require parental consent.

In one embodiment, the interchange (101) is configured to obtain parental consent via messages to and/or from mobile phones (e.g., mobile phone (116)). The messages may be delivered via SMS, MMS, WAP, or other protocols. When a merchant or a service provider determines that parental consent is needed (e.g., to comply with laws, to minimize risk of chargebacks and disputes), the merchant or the service provider may request the interchange (101) to obtain the parental consent.

In one embodiment, a child is asked to provide the mobile phone number (123) of the parent. A message is sent by the interchange (101) to the parent's mobile phone (116) at the phone number (123) (e.g., via SMS or other similar mobile based messaging technology). The message is to describe the activity and ask for the parent's consent. The parent is allowed to respond to this message (e.g., via SMS or other similar mobile based messaging technology) to issue consent. Alternatively, the message requesting the consent may include a link (or a PIN, or a password) which allows the parent to use a user terminal (111) (e.g., a web browser on a personal computer) to issue consent to the website of the merchant or service provider. After the consent is obtained, the child is allowed to participate in the activity. In one embodiment, the child is asked to get the parent to complete the input. For example, in one embodiment, the child is prompted to ask the parent to provide the mobile phone number (123) of the parent and/or the mobile phone number (122) of the child for parental consent.

In one embodiment, the merchant or service provider obtains the mobile phone number (123) of the parent and requests the interchange (101) to obtain the parental consent. In another embodiment, the interchange (101) presents user interfaces (e.g., via a website, or an SMS message) to the child to request the mobile phone number (123) of the parent (e.g., after the child is forwarded to the web portal of the interchange (101) by the merchant or service provider). In one embodiment, pre-registered information is referenced to determine the phone number of the parent.

In one embodiment, a registry is provided to allow a parent to come to a portal site and register phone numbers for their children. The registry can be marketed through public outreach marketing or through the carriers (e.g., when a parent signs up a phone for a child, give them a pamphlet or disclosure about the registry) to encourage registration. The registry entries can be verified through SMS verification methods (e.g., transmitting SMS messages to the parent phones and/or child phones to request the confirmation or verification). When transactions are initiated via phone numbers, the registry is first checked to determine whether the requester is a child and if so, the parent's phone number, so that the child wouldn't even need to provide the parent's phone number in cases where it was preregistered—the registry would already have the info from the parent. The registry could also be built from transactional relationships that occur in a process to obtain parent consent in accordance with laws, regulations and/or rules, such as Children's Online Privacy Protection Act (COPPA). Thus, the registry would then be the main source of parent to child phone mappings to be used for any third party who wants to verify parental consent via SMS.

When the registry is used, there is no need to worry about encryption or hash child information prior to parental consent, since the parent authorizes the registry to keep the data about the child via the registration process.

In one embodiment, the merchant or service provider may request the parental consent in a way similar to the above discussed methods and systems which request confirmation of payments from a parent phone. In one embodiment, the parental consent may be requested via the interchange (101) without making a payment using the funds associated with the phone numbers (e.g., 123).

In one embodiment, the child may be asked to provide their mobile phone number (122) and/or age directly in the user interface for parental consent. If the child provides their cell phone number (122), it is hashed until such time as there is authorization to keep it (since the phone number is considered to be personally identifiable information); alternatively, it may be stored temporarily and later deleted. Upon the authorization, the age of the child is tied to the phone number (122), so the child cannot change their age once a consent notification is put forth. In one embodiment, the system is to check dynamically for each request made to the interchange (101) to determine if the user has surpassed the age threshold. Further, the parent's phone number (123) is tied to the child's phone number (122) so that the parent is granted access to view and control the child's future activity.

In one embodiment, the parental consent is given for a specific transaction or activity. Alternatively, the parental consent may be issued for a set of transactions or activities, such as consent to purchase from this merchant for up to $X over Y time period, consent for all merchants/activities up to $X in spending over Y time period, etc. The parent may request to be contacted for every transaction request from the child, or be contacted for transactions/inquiries of certain types selected by the parent. The parent may authorize a subscription for X time period but not authorize automatic renewal, etc.

In one embodiment, the user of the parent phone (116) at the parent's mobile phone number (123) is allowed to access a set of tools for parental control. For example, the parent can use the tools to view and control the child's activities with the interchange (101) and/or the merchant or service provider. For example, a PIN or password can be provided to the mobile phone (116) at the parent's phone number (123) to allow the parent to log into a portal to view the activities and set controls. For example, the parent may block certain future activity/purchases through these tools. For example, the parent may block the child from making purchases from websites of certain types, or purchases of products or services of certain types.

In one embodiment, the purchases made via the child's mobile phone (117) are billed to the parent's mobile phone number (123). In another embodiment, the purchases made via the child's mobile phone (117) are billed to the child's mobile phone number (122).

In one embodiment, the parent to child relationship is verified through information such as identification of the network, proximity of parent and child area codes and zip code, and/or other information from the carrier (e.g., linked mobile plans, family plans).

In one embodiment, the phone number (122) provided by a user on a user terminal (111) is linked to a browser cookie on the user terminal (111), after the parental consent is obtained for the phone number (122). When a different phone number is entered on the user terminal (111) that has a browser cookie linked to a child's phone number (122), the interchange (101) may scrutinize the new phone number and request parental consent.

FIGS. 21-24 illustrate systems to facilitate parental control according to some embodiments. In FIGS. 21-24, a social networking website (501) is illustrated as an example. In one embodiment, the social networking website (501) is replaced with a different type of third party websites, such as online gaming sites, or other websites that offer content or services to children.

Figure 21:
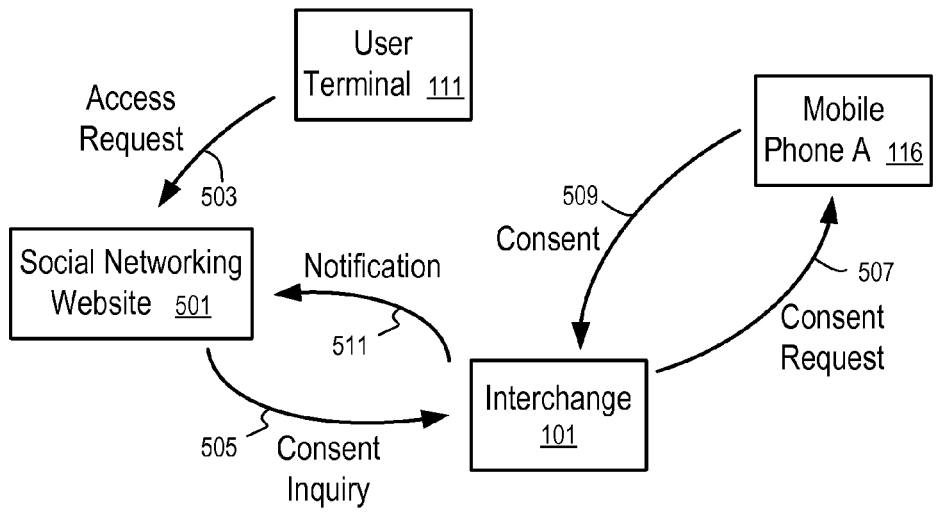
FIGS. 21-24 illustrate systems to facilitate parental control according to some embodiments.

FIG. 21 illustrates a system in which a social networking website (501) uses the interchange (101) to obtain parental consent, when an underage user uses a user terminal (111) to access (503) the social networking website (501).

For example, the underage user may use the user terminal (111) to register with the social networking website (501) (e.g., to create an account), or to participate in online activities that involve the collection of personal information, such as name, home address, email address, telephone number, or other information that would allow someone to identify or contact the underage user. To protect the privacy of the underage user, the social networking website (501) sends a consent inquiry (505) to the interchange (101), which sends the consent request (507) to the mobile phone A (116) of the parent (or legal guardian) of the underage user.

In one embodiment, for the purpose of obtaining the parental consent, the social networking website (501) and/or the interchange (101) obtains an identification of the underage user or the parent of the underage user. The identification is used to determine the phone number A (123) of the mobile phone A (116) of the parent (or legal guardian).

For example, the identification can be online contact information for the underage user, the collection of which for the purpose of obtaining parental control does not require parental consent. The online contact information may be an email address or other identifiers that permits direct contact with the user online, such as a screen name or user name of an instant messaging system or VoIP system. In one embodiment, the identification is used to determine the phone number A (123) of the mobile phone A (116) of the parent of the underage user.

For example, the interchange (101) may obtain the email address of the parent from the underage user and look up the phone number A (123) from the data storage facility (107) based on the associations between emails and phone numbers. If the data storage facility (107) does not already have data associating the email address with the phone number A (123), the interchange (101) may contact the parent through the email address to obtain the phone number A (123) and/or the parental consent.

Alternatively, the interchange (101) may directly obtain the phone number A (123) of the parent from the underage user for the sole purpose of obtaining parental consent.

Alternatively, the interchange (101) may obtain the phone number B (122) of the underage user to determine the phone number A (123) of the parent and to obtain parental consent.

In some embodiments, the social networking website (501) and/or the interchange (101) obtains, from the underage user, both an identification of the underage user and an identification of the parent of the underage user. The consent request (507) further includes a request to confirm the parental relationship between the people identified by the identifications collected from the underage user. For example, the identification of the underage user may include an email address of the underage user; and the identification of the parent may include the phone number A (123) of the parent.

In one embodiment, the identification of the underage user is further used to contact the underage user to verify that the identity of the underage user. For example, after the parental consent is obtained for the underage user as identified by the email address specified by the underage user, the social networking website (501) (or the interchange (101)) may transmit a code to the email address and require the underage user to provide the code back to the social networking website (501) to activate the account of the underage user in the social networking website (501). The correct code received back from the underage user indicates that the email address is indeed under the control of the underage user.

In one embodiment, the interchange (101) is configured to verify the parental relationship based on the identification of the underage user and the identification of the parent that are collected from the underage user.

For example, when the identifications of the underage user and the parent are phone numbers (122 and 123), the interchange (101) may determine whether the phone numbers (122 and 123) are already linked in a parental relationship in a payment service provided by the interchange (101) (e.g., as in FIG. 4). Alternatively, the interchange (101) may contact telecommunications carries to determine whether the phone numbers (122 and 123) have the same billing address, or are included in a family plan, to indirectly confirm a parental relationship.

In FIG. 21, after the interchange (101) obtains the consent (509) from the mobile phone A (116), the interchange (101) provides the notification (511) to the social networking website (501), which allows the social networking website (501) to grant the access request (503).

In one embodiment, the interchange (101) is operated by an entity separate from an entity operating the social networking website (501). In another embodiment, the interchange (101) and the social networking website (501) are operated by the same entity.

Figure 22:
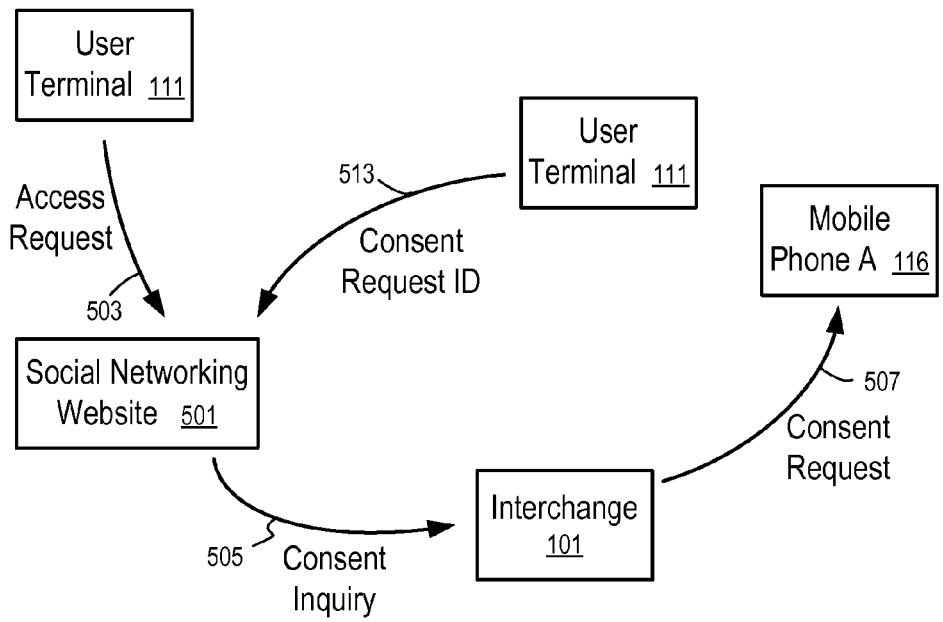

FIG. 22 shows an embodiment in which the parent may use a user terminal (111) separate from the mobile phone A (116) to provide the consent. In FIG. 22, the consent inquiry (505) includes a consent request ID (513) (or a PIN or a password) that is representative of the consent inquiry. The consent request ID (513) may be embedded in a link, or provided as a string of characters. The parent may use the consent request ID (513) to directly issue the parental consent by visiting the social networking website (501).

The receipt of the consent request ID (513) is an indication that the user of the mobile phone A (116) provides the parental consent via providing the consent request ID (513), which is available only to the mobile phone A (116) (via the interchange (101)).

For example, in one embodiment, the consent inquiry (505) requests the parent to visit the social networking website (501) to provide the consent request ID (513) to activate the account of the underage user. In some embodiments, the consent request ID (513) also serves as a password to access parental control tools provided for the account of the underage user in the social network website (501), as further discussed in connection with FIG. 24.

In one embodiment, the user terminal (111) used by the parent to provide the parental consent is different from the user terminal (111) used by the underage user to access the social networking website (501). In another embodiment, the user terminal (111) used by the parent to provide the parental consent is the same user terminal (111) used by the underage user to access the social networking website (501).

For example, the parent may reveal the consent request ID (513) to the underage user to allow the underage user to provide the consent request ID (513) to the social networking website (501) to indicate the parental consent.

Alternatively, the interchange (101) may provide a web portal to receive the consent represented by the consent request ID (513); and in response to the parental consent, the interchange (101) notifies the social networking website (501), as in FIG. 21. In such an embodiment, the consent inquiry (505) may not include the consent request ID (513); and the consent request ID (513) can be generated or assigned to the consent inquiry (505) by the interchange (101). In some embodiments, the consent request ID (513) includes a one time code (or one time password) that is valid for a predetermined period of time and expires after the predetermined period of time.

In one embodiment, when the consent request ID (513) is received from the user terminal (111) in the interchange (101) to indicate the parental consent, the interchange (101) is configured to further verify the identity of the sender of the consent request ID (513). For example, the message including the consent request ID (513) may be required to include a PIN associated with the mobile phone A (116), such as a PIN for the voice mail on the mobile phone A (116), or a PIN assigned to the mobile phone A (116) to control the payments made using funds associated with the mobile phone A (116). For example, the funds may be collected via sending premium messages from the interchange (101) to the mobile phone A (116), or via charging a credit card or a debit card associated with the phone number A (123) of the mobile phone A (116) in the data storage facility (107).

Figure 23:
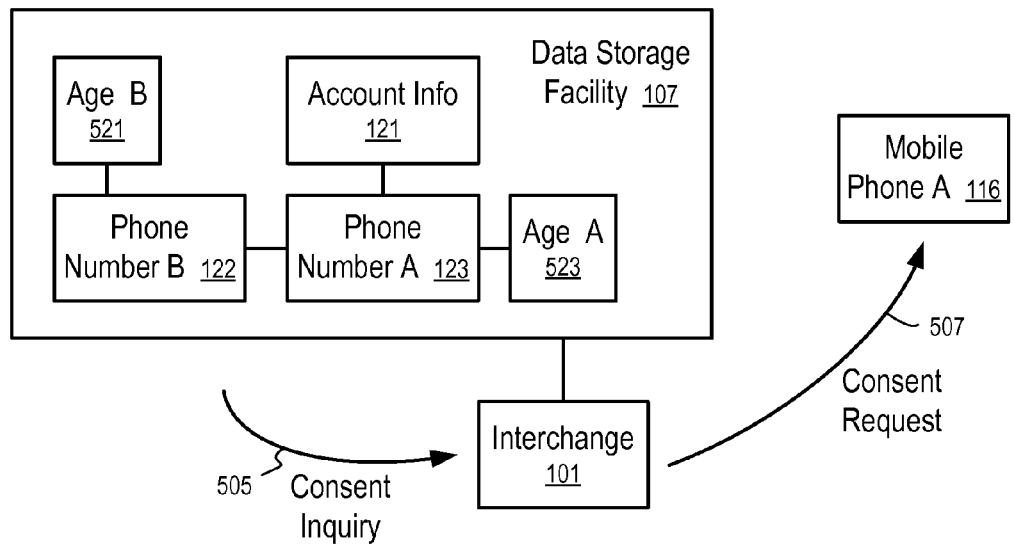

In one embodiment, the interchange (101) is configured to store data representing parental relationships between users of various phone numbers (e.g., 122 and 123), as illustrated in FIG. 23.

In FIG. 23, the data storage facility (107) of the interchange (101) stores the phone numbers (e.g., 122 and 123) in connection with indicators of ages (e.g., 521 and 523) of the users of the respective phone numbers (e.g., 122 and 123).

In one embodiment, the data as illustrated in FIG. 23 is stored in the data storage facility (107) when the parent at the phone number A (123) customizes the services of the interchange (101). The parent may associate the account information (121) and the phone number B (122) with the phone number A (123), in a way as illustrated in FIG. 10.

In one embodiment, the data storage facility (107) stores the age (521) of the underage user of the phone number (122) and updates the age (521) once a year automatically, until a time when the parental consent is no longer needed. In another embodiment, the interchange (101) is to check dynamically for each request made to the interchange (101) to determine if the user has surpassed the age threshold. For example, the data storage facility (107) may store the date on which the age (521) (or parental consent) is received from the parent; and the age (521) can be updated on the anniversaries of the date. Alternatively, a birth date (or year) of the underage user may be stored to indicate the age (521).

In some embodiments, the interchange (101) stores the data to indicate the age (523) of the parent using the phone number A (123). The age indicator (523) can be used to determine whether the user of the phone number A (123) is eligible for issuing parental consent. For example, the age indicator (523) may be verified via a verified credit card (e.g., account information (121) associated with the phone number A (123) to make a payment), or via other means, such as a digital certification.

In another embodiment, the data as illustrated in FIG. 23 is stored after the underage user registers with the interchange (101) to use the payment service of the interchange (101).

After the parent consent is obtained, the underage user of the phone number B (122) may use funds associated with the phone number A (123) to pay for purchases (e.g., purchases from the social networking website (501) and/or from servers (113) of other online merchants).

In a further embodiment, the data illustrated in FIG. 23 is stored after the interchange (101) is used to obtain parental consent on behalf of a third party. For example, the social networking website (501) may send a consent inquiry to the interchange (101). In response to the consent inquiry, the interchange identifies the phone number A (123) of the parent and transmits the consent request (507) to the mobile phone A (116) at the phone number A (123). After the parental consent is received, the interchange stores the data as illustrated in FIG. 23, including the relation between the phone number B (122), the phone number A (123) and the indicators of the ages (521 and 523).

In some embodiments, the data storage facility (107) further links the phone numbers (122 and 123) with other online contact information, such as email addresses. Thus, the online contact information can be collected from underage users without prior parental consent for the purpose of obtaining parental consent. The online contact information can be used to look up the phone number A (123) of the parent to send the consent request (507).

In one embodiment, the consent inquiry (505) may be received from entities other than the social networking website (501). For example, the consent inquiry (505) may be received from schools for certain outdoor activities or trips. For example, the consent inquiry (505) may be received from a website targeting underage users.

In one embodiment, an underage user is allowed to register with the interchange (101) for the services related to parental consent, without having to use the payment services of the interchange (101).

For example, the underage user may obtain a user identifier, which is to be associated with the phone number A (123) for parental consent. When the consent inquiry includes the user identifier, the phone number A (123) is determined and used to send the consent request (507). Thus, to obtain the parental consent, only the user identifier needs to be collected from the underage user. In one embodiment, the user identifier is not usable to permit the physical or online contacting of the underage user. In one embodiment, the user identifier is reserved for the sole purpose of identifying the underage user in obtaining parental consent. Alternatively, the user identifier may be an email address of the underage user or the phone number B (122), which permits the physical or online contacting of the underage user. In another embodiment, the user identifier may be used by the underage user to access the payment service provided by the interchange (101).

Figure 24:
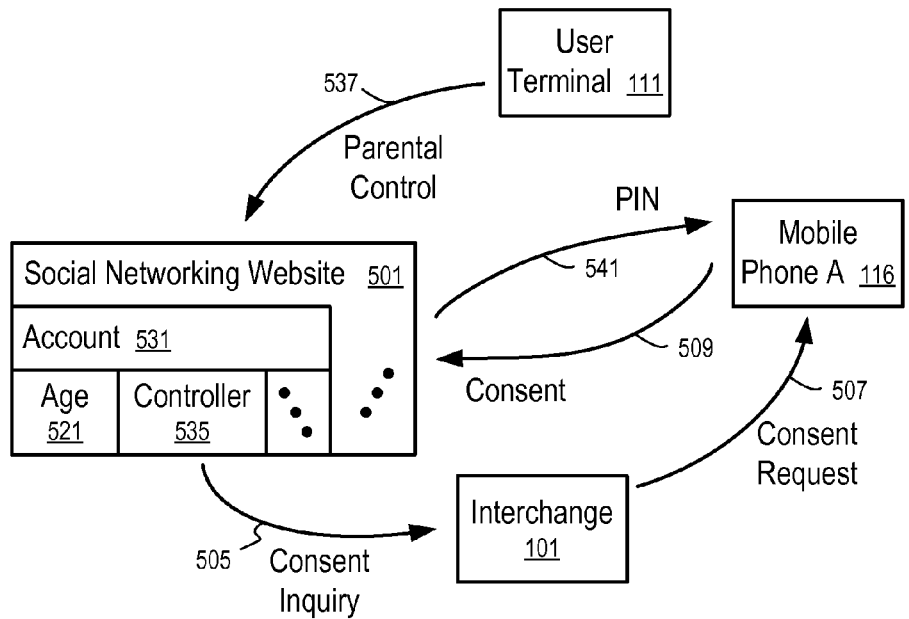

In FIG. 24, the social networking site (501) includes an account (531) for the underage user. The account (531) may store an indicator of the age (521) of the user. The age (521) can be used to identify the activities that may require parental control and/or consent.

In one embodiment, the social networking site (501) further includes a controller (535) that is accessible to the parent of the underage user to perform parental control. For example, the controller (535) may allow the parent to specify the types of activities that are allowed access by the underage user. For example, the controller (535) may be used to specify the times of the day in which the underage user may access certain services of the social networking site (501). For example, the controller (535) may provide the parent with access to the general kinds of personal information collected online from the underage user, as well as the specific information collected from the underage user who visits the social networking website (501).

In one embodiment, after the parent provides the consent (509) from the mobile phone A (116), the social networking website (501) provides a PIN (541) (or a password) to the mobile phone A (116) to allow the user of the mobile phone A (116) to access the controller (535) of the account (531).

In FIG. 24, the consent (509) and the PIN (541) are communicated between the social networking website (501) and the mobile phone A (116) directly without going through the interchange (101). In another embodiment, the consent (509) and the PIN (541) are communicated between the social networking website (501) and the mobile phone A (116) indirectly via the interchange (101).

In one embodiment, the interchange (101) maintains a list of websites to which the parent at the mobile phone A (116) has provided parental consent. The parent may use the mobile phone A (116) to request access to the controller (535) for the respective account (531) of the underage child. After the interchange (101) verifies the identity of the user of the mobile phone A (116) (e.g., via a PIN or a password), the interchange (101) and/or the respective website (e.g., 501) can provide a password (e.g., a one time password valid for a limited time period) for the parent to access the controller (535) and to perform parental control (537) using a user terminal (111). In one embodiment, the interchange (101) notifies the underage user at the phone number B (122) (e.g., via an SMS message), when the access to the controller (535) has been requested.

Figure 25:
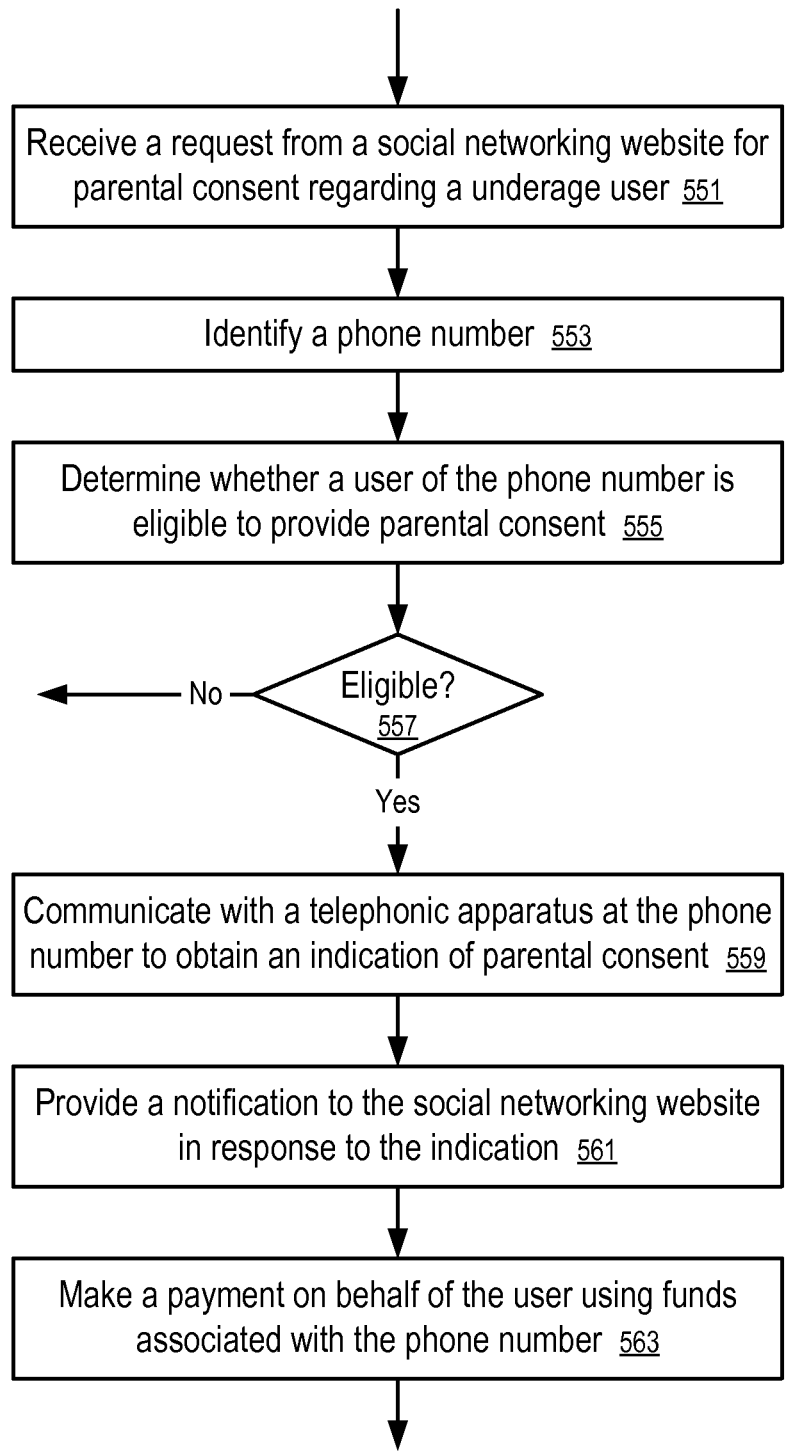
FIG. 25 shows a method to facilitate parental control according to one embodiment.

FIG. 25 shows a method to facilitate parental control according to one embodiment. In FIG. 25, the interchange is to receive (551) a request from a social networking website (501) for parental consent regarding a underage user, identify (553) a phone number (123), and determine (555) whether a user of the phone number (123) is eligible to provide parental consent.

In one embodiment, the interchange (101) is to conclude that the user of the phone number (123) is eligible to provide parental consent if the phone number (123) is at least associated with a valid credit card number included in the account information (121).

In one embodiment, the interchange (101) is to conclude that the user of the phone number (123) is eligible to provide parental consent if an age (523) of the user has been previously verified.

If the user of the phone number (123) is eligible (557) to provide parental consent, the interchange (101) is to communicate (559) with a telephonic apparatus (e.g., mobile phone (116)) at the phone number (123) to obtain an indication of parental consent (509), and provide (561) a notification (511) to the social networking website (501) in response to the indication.

For example, the interchange (101) is to transmit a message to the telephonic apparatus (e.g., mobile phone (116)) via a short message service (SMS). The message is to identify an activity that requires the parental consent. The interchange (101) may receive, from the telephonic apparatus (e.g., mobile phone (116)) via a short message service (SMS), a message containing the indication of parental consent (509). Alternatively, the message requesting the consent may include a code (e.g., request ID (507)) to allow a user of the telephonic apparatus (e.g., mobile phone (116)) to provide the code back to the social networking website (501) to indicate parental consent.

In one embodiment, the interchange (101) may make (563) a payment on behalf of the underage user using funds associated with the phone number (123). For example, the underage user may make a purchase from the social networking website (501) or other websites hosted on servers (113). In one embodiment, the interchange (101) transmits one or more premium messages to the telephonic apparatus (e.g., mobile phone (116)) at the phone number (123) to collect the funds.

In one embodiment, the interchange (101) is to transmit a code to the telephonic apparatus (e.g., mobile phone (116)) via a short message service (SMS) to allow a user of the telephonic apparatus (e.g., mobile phone (116)) to access a parental control section (e.g., controller (535)) of an account (531) hosted on the social networking website (501).

In one embodiment, the request for parental consent is received in response to a user accessing (503) the social networking website (501); and the interchange (101) is to present a web page to the user to request the phone number (123) for parental consent, after the user is redirected from the social networking website (501) to a web portal of the interchange (101). Alternatively, the social networking website (501) may collect the phone number (123) of the parent from the underage user. Alternatively, the social networking website (501) may collect the phone number (122) of the underage user; and the interchange (101) is to look up the phone number (123) of the parent from the data stored in the data storage facility of the interchange (101).

In one embodiment, the interchange (101) is to verify a parental relationship between a user of the phone number (123) and the user accessing the social networking website (501) by matching stored data with an identification received from the user accessing the social networking website (501), or via communicating with the telecommunications carrier of the phone numbers (122 and 123) to correlate billing information.

In one embodiment, the interchange (101) is configured to selectively ban or restrict certain phone numbers from using the interchange (101) to make payment transactions. In one embodiment, a phone number (e.g., 123) can be banned from using the interchange (101) to make payments to one set of merchants, while being allowed to use the interchange (101) to make payments to other merchants. In one embodiment, the interchange (101) is configured to track the reasons for which the restriction is applied and/or manage temporary banning. In one embodiment, the tracked reason for the restriction is further used to evaluate the risk in transactions that are not explicitly banned; and the interchange (101) is to selectively reject payment requests based on the tracked reasons for the restrictions and/or the circumstances of the requests currently under consideration.

In one embodiment, the interchange (101) provides a flexible mechanism to allow a partial ban based on the characteristics of the items to be purchased. For example, the interchange (101) may be configured to allow a phone number (e.g., 123) to be used to request payments to a merchant for a first type of services but not a second type of products. For example, the funds associated with a phone number (e.g., 123) can be configured to allow payments for a subscription service for a period of time at a game site, but not allow payments to purchase game content.

Figure 26:
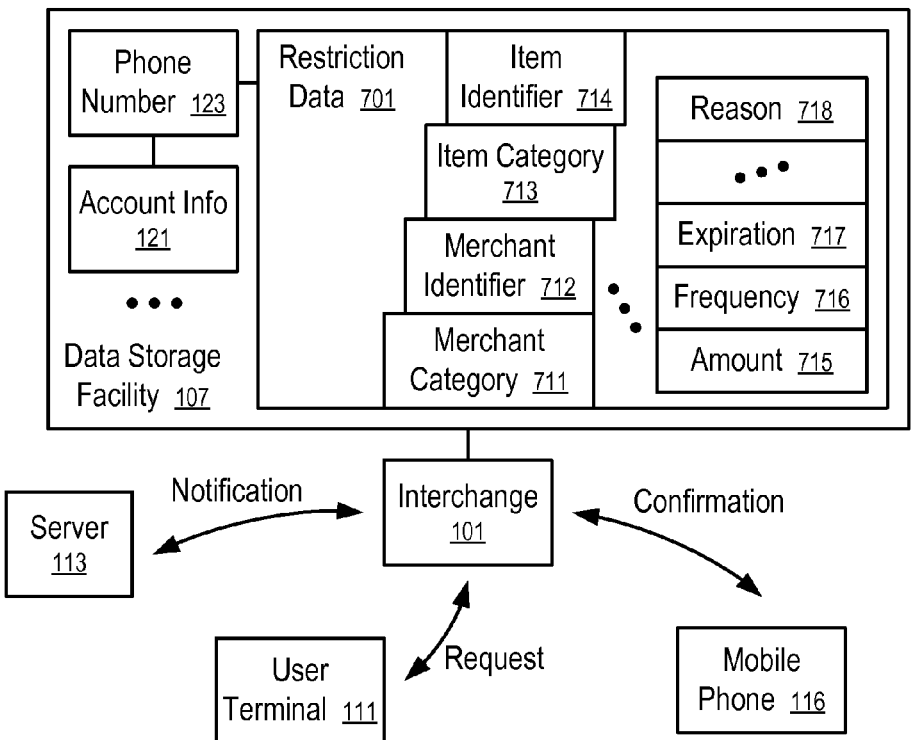
FIG. 26 shows a system to selectively restrict payment transactions according to one embodiment.

FIG. 26 shows a system to selectively restrict payment transactions according to one embodiment. In FIG. 26, the interchange (101) is configured to receive a request to pay a merchant from a user terminal (111) using funds associated with the phone number (123) of the mobile phone (116). In response to the request, the interchange (101) is configured to determine whether to continue processing the request based on the restriction data (701) associated with the phone number (123) and to confirm the request via communicating with the mobile phone (116) at the phone number (123). If the request is not rejected based on the restriction data, or disapproved by the user via the mobile phone (116), the interchange (101) is to process the payment and transmit a notification to the server (113) of the merchant about the status of the payment request.

In FIG. 26, the data storage facility (107) of the interchange (101) is configured to store restriction data (701) in association with the phone number (123) to indicate the restrictions on the phone number (123).

In one embodiment, the restriction data (701) is configured to allow restrictions to be specified in different levels of granularity.

For example, at one level, the restriction data (701) may be used to indicate that the phone number (123) is entirely banned from using the services of the interchange (101); and at another level, the restriction data (701) may be used to indicate that the phone number (123) is banned for payments to certain merchants but not others.

In one embodiment, the restriction data (701) specifies a merchant category (711) to indicate that the phone number (123) has restrictions on payment transactions to merchants in the merchant category (711). The restrictions may prohibit the use of funds associated with the phone number (123) to pay for any purchases from the merchants in the merchant category (711), or prohibit certain types of purchases but not others.

In one embodiment, the restriction data (701) specifies a merchant identifier (712) to indicate that the phone number (123) has restrictions on payment transactions to the particular merchant. The restrictions may prohibit the use of funds associated with the phone number (123) to pay for any purchases from the particular merchant, or prohibit certain purchases but not others.

In one embodiment, the restriction data (701) specifies an item category (713) to indicate that the phone number (123) has restrictions on payments for purchases in the category (713). The restrictions may prohibit the use of funds associated with the phone number (123) to pay for purchases in the item category (713) from any merchants, or prohibit purchases from certain merchants (e.g., as indicated by the merchant identifier (712) and/or the merchant category (711)) but not others.

In one embodiment, the restriction data (701) specifies an item identifier (714) (e.g., identifying a product or a service) to indicate that the phone number (123) has restrictions on payments for such an item (714). The restrictions may prohibit the use of funds associated with the phone number (123) to pay for such an item (714) from any merchants, or prohibit purchases from certain merchants (e.g., as indicated by the merchant identifier (712) and/or the merchant category (711)) but not others.

In one embodiment, the restriction data (701) includes the expiration data (717) to indicate the time period in which the restriction data (701) is valid. In one embodiment, the restriction is designed to be a temporary ban (e.g., to deter fraudulent activities). In one embodiment, the expiration data (717) may indicate an indefinite ban.

In one embodiment, the restriction data (701) further includes a threshold to ban certain payment transactions that meet the threshold requirement. For example, in one embodiment, the restriction data (701) includes a frequency threshold (716) and an amount threshold (715). When a purchase of the item identified by the identifier (714) (or items in the category (713)) would cause the threshold (e.g., 715 or 716) to be exceeded, the interchange (101) is to reject the payment request for the purchase based on the restriction data (701).

In one embodiment, the amount threshold (715) is an aggregated amount of purchases of restricted items (e.g., as indicated by the item identifier (714) and/or the item category (713)) and/or from restricted merchants (e.g., as indicated by the merchant identifier (712) and/or the merchant category (711)) within a period of time (e.g., a month, a week, or a year).

In one embodiment, the amount threshold (715) is compared with the total amount of the current purchase to determine whether the amount threshold (715) is exceeded.

In one embodiment, the frequency threshold (715) indicates a count of restricted purchases of items (e.g., as indicated by the item identifier (714) and/or the item category (713)) and/or from restricted merchants (e.g., as indicated by the merchant identifier (712) and/or the merchant category (711)) within a period of time (e.g., a month, a week, or a year).

In one embodiment, the restriction data (701) includes a field to track the reason (718) for the restriction. The decision engine (151) is configured to use the reason (718) to evaluate the risk in related transactions and/or to determine whether to initiate communications to modify the restriction.

In one embodiment, the interchange (101) is configured to monitor transaction histories. When fraudulent activities or suspected fraudulent activities are detected, the interchange (101) is configured to automatically generate part of the restriction data (701) to reduce risk. For example, when the patterns of the payment requests indicate that the mobile phone (116) may have been stolen or lost, the interchange (101) may block certain payment requests (or the entire phone number (123) relative to the services of the interchange (101)).

In one embodiment, the interchange (101) is configured to generate the restriction data (701) based on inputs from the user via the mobile phone (116) and/or the user terminal (111). For example, when a merchant identified by the merchant identifier (712) has an aggressive market campaign, the user of the mobile phone (116) may request the interchange (101) to block payments to the merchant identified by the identifier (712), or block payments to the merchant identified by the merchant identifier (712) for certain items (e.g., as identified by the item identifier (714) and/or the purchase category (713)).

For example, in one embodiment, a parent may request the interchange (101) to set up restrictions for the phone number (123) of a child of the parent to exercise parental control.

In one embodiment, a merchant may request the interchange (101) to set up part of the restriction data (701) for a customer having the phone number (123). For example, based on the activities of the customer, the merchant may prohibit the customer from purchasing certain items (e.g., as indicated by the item identifier (714) and/or the item category (713)) while allowing the customer to purchase other items from the merchant. The merchant may request a ban to prohibit the customer from making further purchases from the merchant (e.g., as identified by the merchant identifier (712)), temporarily or indefinitely.

In one embodiment, the reason (718) includes data identifying the entity that initiated the restriction, data indicating whether the entity is willing to be contacted to reconsider the restriction, the contact information (e.g., email address, phone number, instant messaging user identifier) of the entity, and/or conditions required for reconsideration.

In one embodiment, a payment request from the server (113) of the merchant is formulated to have a request transmitted to the interchange (101) via the user terminal (111). For example, in one embodiment, a check-out page of the server (113) includes a reference to the interchange (101) to direct the user to the interchange (101) for processing the payment. The interchange (101) may provide the processing results (e.g., the notification) to the server (113) via the user terminal (111), or via a direct communication with the server (113) without going through the user terminal (111). For example, in one embodiment, a confirmation page provided by the interchange (101) to the user terminal (111) may include a reference to the server (113) to transmit the processing result to the server (113).

Figure 27:
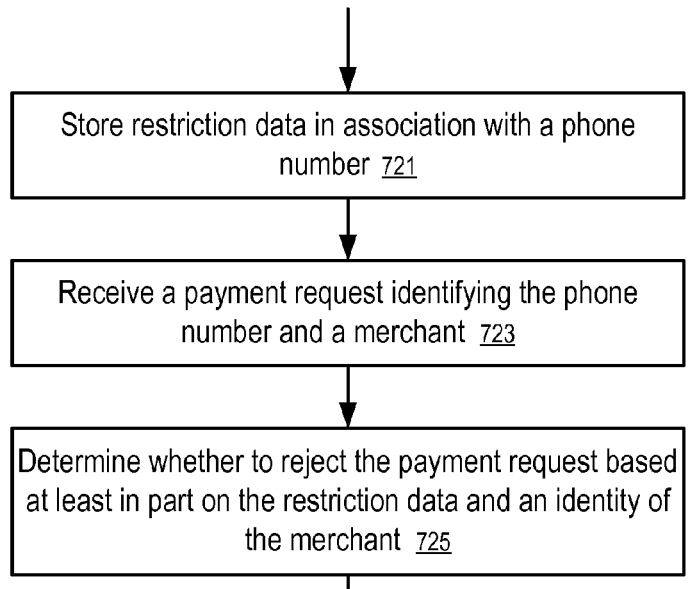
FIGS. 27-28 show methods to selectively restrict payment transactions according to one embodiment.
Figure 28:
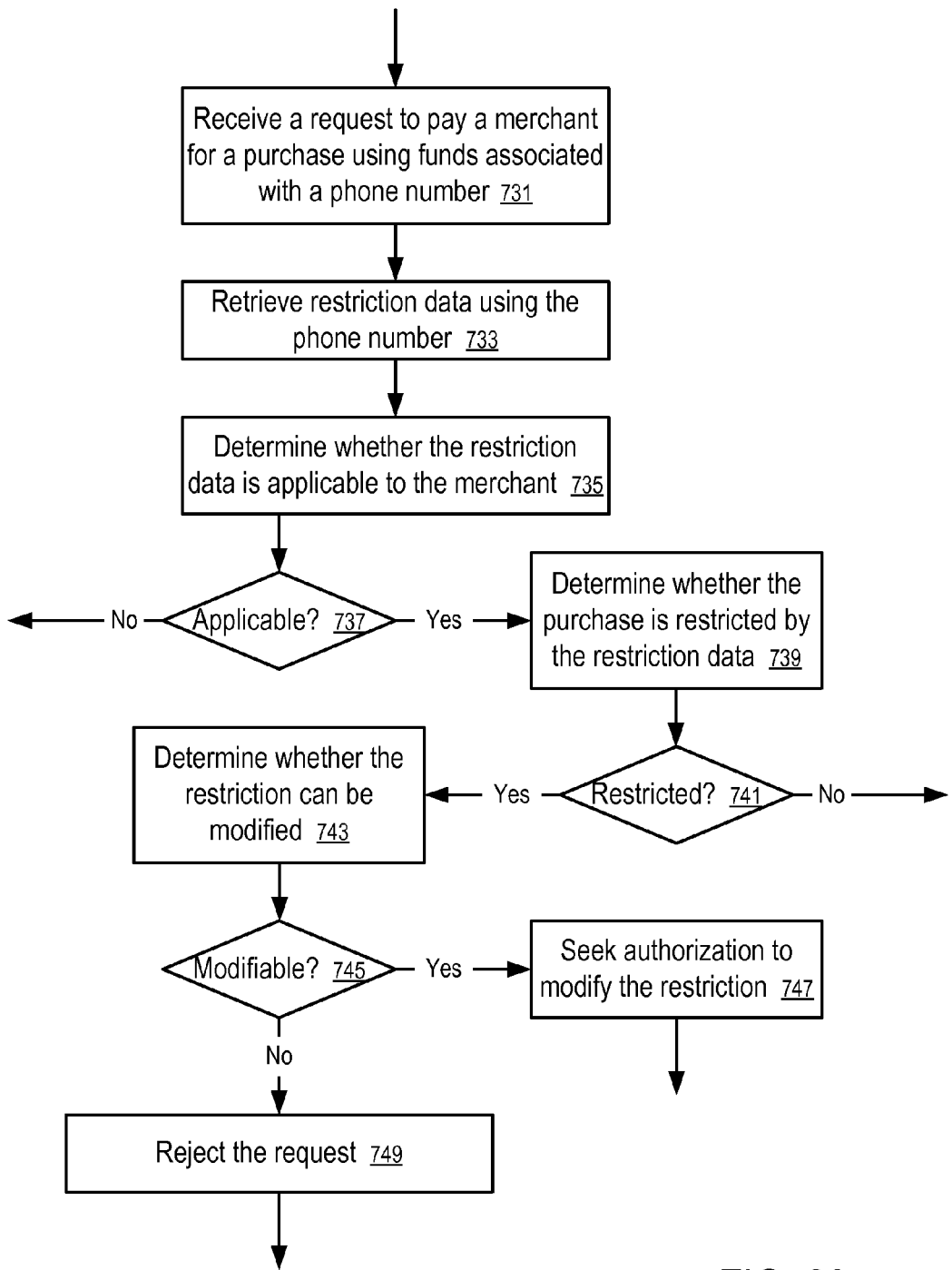

FIGS. 27-28 show methods to selectively restrict payment transactions according to one embodiment.

In FIG. 27, the interchange (101) is configured to store (721) restriction data (701) in association with a phone number (123). When a payment request identifying the phone number and a merchant is received (723), the interchange (101) determines (725) whether to reject the payment request based at least in part on the restriction data (701) and an identity of the merchant.

For example, in FIG. 28, the interchange (101) is configured to receive (731) a request to pay a merchant for a purchase using funds associated with a phone number (123). In response to the request, the interchange (101) retrieves (733) restriction data (701) using the phone number (123) and determines whether the restriction data (701) is applicable to the merchant.

If it is determined (737) that the restriction data (701) is applicable to the merchant (e.g., when the merchant is identified by the merchant identifier (712) or the merchant category (711) in the restriction data (701)), the interchange (101) further determines (739) whether the purchase is restricted by the restriction data (701). In one embodiment, the interchange (101) determines whether the purchase is restricted by the restriction data (701) based on the item identifier (714), or the item category (713), associated with the merchant identifier (712) or the merchant category (711), and the associated thresholds, such as the frequency threshold (716) and the amount threshold (715).

If it is determined (741) that the purchase is restricted by the restriction data (701), the interchange (101) further determines (747) whether the restriction can be modified. In one embodiment, the decision engine (151) of the interchange (101) is configured to determine (747) whether the restriction can be modified based on the reason (718) for the restriction.

If it is determined (745) that the restriction is modifiable, the interchange (101) seeks (747) authorization to modify the restriction. For example, when the restriction is initiated by the user of the mobile phone (116), the interchange (101) may communicate with the mobile phone (116) to determine whether the restriction can be overridden for the current request. For example, when the restriction is initiated by the merchant, the interchange (101) may communicate with the server (113) of the merchant to request authorization. For example, when the restriction is initiated by the interchange (101) based on the transaction history, the decision engine (151) is to determine whether the pattern of transactions has changed sufficiently to suspend the restriction, or temporarily override the restriction for the current transaction.

In one embodiment, if it is determined (745) that the restriction is not modifiable, the interchange (101) is to reject (749) the request.

In one embodiment, if it is determined (737) that the restriction data (701) is not applicable to the merchant, or determined (741) that the purchase is not restricted by the restriction data (701), the interchange (101) communicates with the mobile phone (116) at the phone number (123) to obtain a confirmation of the payment request from the user of the mobile phone (116).

In one embodiment, the interchange (101) is configured to fulfill the payment request using funds associated with the phone number (123).

In one embodiment, the interchange (101) is configured to transmit at least one premium message to the phone number (123) to collect, via a telecommunication carrier of the mobile phone (116), funds for the payment request. The interchange (101) is configured to transmit the notification to the server (113) of the merchant after receiving a confirmation from the telecommunication carrier for the delivery of the one premium message transmitted to the mobile phone (116) at the phone number (123). In one embodiment, the premium message is transmitted via a short message service and contains one of a predetermined set of premium codes that indicate the prices the telecommunication carrier of the mobile phone (116) will charge for the premium messages that contain the respective premium codes.

In one embodiment, to fulfill the payment request, the interchange (101) is configured to charge a financial account associated with the phone number (123) to collect funds. Examples of the financial account include a credit account, a debit account, a prepaid account, a checking account, and a savings account.

In one embodiment, the restriction data (701) identifies a merchant category (711); and the interchange (101) is to determine (725) whether to reject the payment request based on whether the merchant is in the merchant category (711). For example, if the merchant is in the merchant category (711), the payment request is to be rejected. In one embodiment, the rejection is further based on other conditions, such as whether the purchased item is specified in the restriction data (701), whether a threshold (e.g., 715 or 716) is exceeded, etc.

In one embodiment, the restriction data (701) identifies a list of one or more banned merchants (e.g., via the merchant identifier (712)); and the interchange (101) is to determine (725) whether to reject the payment request based on whether the merchant is in the list. For example, if the merchant is in the list, the payment request is to be rejected. In one embodiment, the rejection is further based on other conditions, such as whether the purchased item is specified in the restriction data (701), whether a threshold (e.g., 715 or 716) is exceeded, etc.

In one embodiment, the restriction data (701) allows payments using funds associated with the phone number (123) for purchasing a first item from the merchant but not a second item from the merchant. In one embodiment, the first item and the second item are one of: products and services. In one embodiment, the first item and the second item have different types. In one example, the first item is a product; and the second item is a service. In another example, the first item is a service; and the second item is a product.

In one embodiment, the restriction data (701) identifies an item category (713) that includes the second item; the payment request identifies an item to be paid for; and the interchange (101) is to determine (725) whether to reject the payment request based on whether the item to be paid for is in the item category (713). If the item to be paid for is in the item category (713), the payment request is to be rejected. In one embodiment, the rejection is further based on other conditions, such as whether a threshold (e.g., 715 or 716) is exceeded, etc.

In one embodiment, the restriction data (701) allows payments using funds associated with the phone number (123) for purchasing from the merchant during a first time period but not a second time period.

In one embodiment, the restriction data (701) includes a threshold for an aggregated amount (e.g., 715); and the interchange (101) is to determine (725) whether to reject the payment request based on whether the threshold would be exceeded by the fulfillment of the payment request.

In one embodiment, the restriction data (701) includes a threshold for purchase frequency (e.g., 716); and the interchange (101) is to determine (725) whether to reject the payment request based on whether the threshold would be exceeded by the fulfillment of the payment request.

In one embodiment, the interchange (101) is configured to generate at least a portion of the restriction data (701) based on input from a parent of a user of the phone number (123), or input from a merchant from which a user of the phone number (123) has previously made a purchase paid for via the interchange (101) using the phone number (123).

In one embodiment, the interchange (101) is configured to generate at least a portion of the restriction data based on past payment transactions processed by the interchange (101) using funds associated with the phone number (123).

In one embodiment, the restriction data (701) includes indications of reasons (e.g., 718) for the restrictions; and the reasons (e.g., 718) identify entities that are authorized to modify respective restrictions in the restriction data (701).

In one embodiment, the common format processor (133) of the interchange (101) includes a decision engine (151) to decide whether to reject the payment request based on whether the identity of the merchant is identified in the restriction data (701) and whether an item purchased via the payment request is identified in the restriction data (701).

Figure 29:
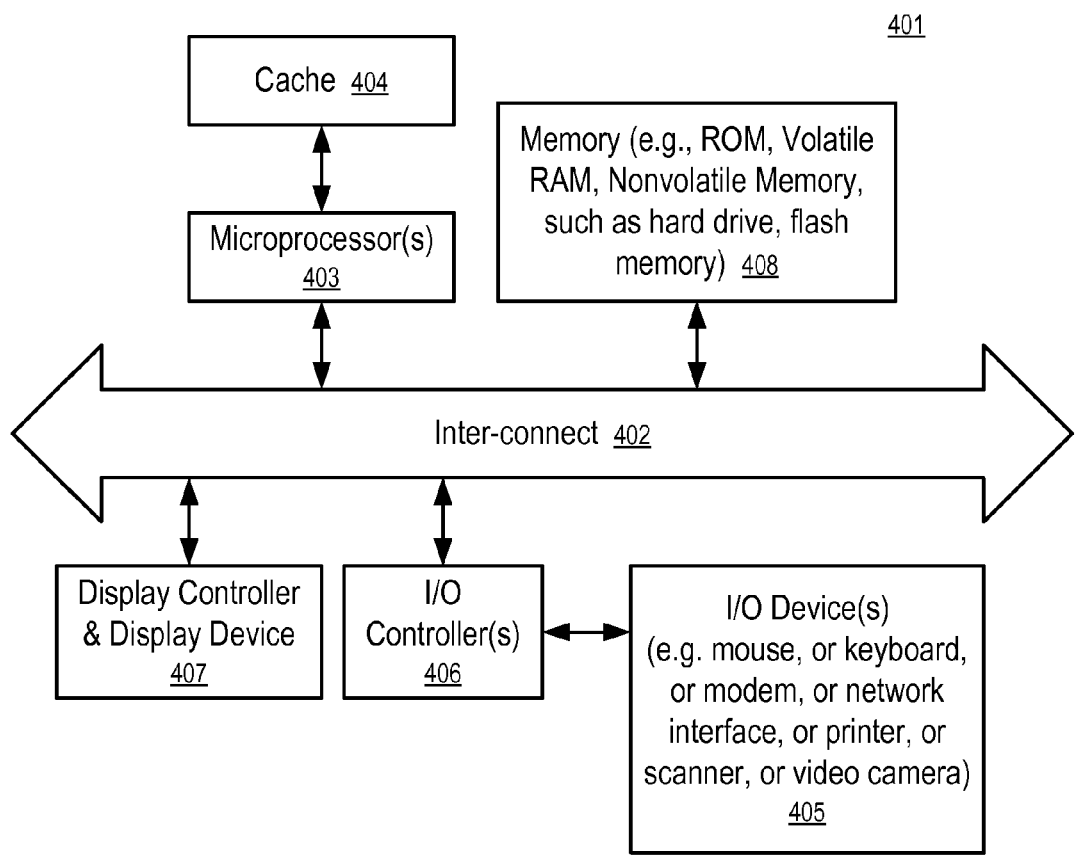
FIG. 29 shows a data processing system, which can be used in various embodiments.

FIG. 29 shows a data processing system, which can be used in various embodiments. While FIG. 29 illustrates various components of a computer system, it is not intended to represent any particular architecture or manner of interconnecting the components. Some embodiments may use other systems that have fewer or more components than those shown in FIG. 29.

In one embodiment, each of the interchange (101), the data storage facility (107), the controllers (115), the mobile phones (e.g., 116, 117), the user terminals (111), the account server (125) and the servers (113) can be implemented as a data processing system, with fewer or more components, as illustrated in FIG. 29. In one embodiment, the interchange (101) is a server computer system implemented using a data processing system illustrated in FIG. 29, without some of the components (e.g., a display device).

In FIG. 29, the data processing system (401) includes an inter-connect (402) (e.g., bus and system core logic), which interconnects a microprocessor(s) (403) and memory (408). The microprocessor (403) is coupled to cache memory (404) in the example of FIG. 29.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method executed by an interchange computing device for managing transactions between a merchant server and a consumer having a telephonic apparatus, comprising:
    storing, in the interchange computing device, restriction data in association with a phone number, the restriction data having at least one of a merchant and a merchant category;

receiving, in the interchange computing device, a payment request from the merchant server identifying the phone number, and a merchant identifier associated with the merchant server;

determining, by the interchange computing device, whether the restriction data is applicable to the merchant as identified by the merchant identifier;

if the restriction data is applicable to the merchant then determining, by the interchange computing device, whether to reject the payment request based at least in part on the restriction data;

if the payment request is not rejected based on the restriction data:
communicating, by the interchange computing device, with the telephonic apparatus at the phone number to confirm the payment request,
after confirmation of the payment request, transmitting, by the interchange computing device, a notification to the merchant, and
fulfilling, by the interchange computing device, the payment request using funds associated with the phone number;

if the payment request is rejected based on the restriction data then determining whether the restriction data can be modified;

if the restriction data can be modified then seeking, with the interchange computing device, authorization to modify the restriction data;

if the authorization is received to modify the restriction data then:
communicating, by the interchange computing device, with the telephonic apparatus at the phone number to confirm the payment request,
after confirmation of the payment request, transmitting, by the interchange computing device, a notification to the merchant, and
fulfilling, by the interchange computing device, the payment request using funds associated with the phone number; and if the payment authorization is not received then refusing, by the interchange computing device, fulfilling of the payment request.

2. The method of claim 1, further comprising:
transmitting, from the interchange computing device, at least one premium message to the phone number to collect, via a telecommunication carrier of the telephonic apparatus, funds for the payment request;
wherein the notification is transmitted to the merchant after receiving a confirmation from the telecommunication carrier for the delivery of the at least one premium message; and
the premium message is transmitted via a short message service.

3. The method of claim 1, wherein the fulfilling the payment request comprises charging a financial account associated with the phone number to collect funds for fulfillment of the payment request.

4. The method of claim 3, wherein the financial account is one of: a credit account, a debit account, a prepaid account, a checking account, and a savings account.

5. The method of claim 1, wherein the restriction data identifies a merchant category; the determining of whether to reject the payment request includes determining whether the merchant is in the merchant category; if the merchant is not in the merchant category, the payment is not rejected; and if the merchant is in the merchant category, the payment request is to be rejected.

6. The method of claim 1, wherein the restriction data identifies a list of one or more banned merchants; the determining of whether to reject the payment request includes determining whether the merchant is in the list; if the merchant is not in the list, the payment is not rejected; and if the merchant is in the list, the payment request is to be rejected.

7. The method of claim 1, wherein the restriction data allows payments using funds associated with the phone number for purchasing a first item from a merchant but not a second item from a merchant.

8. The method of claim 7, wherein the first item and the second item are one of: products and services.

9. The method of claim 8, wherein the restriction data identifies a purchase category including the second item; and the determining of whether to reject the payment request includes determining whether the item to be paid for is in the purchase category.

10. The method of claim 1, wherein the transaction detail includes a time; the restriction data allows payments using funds associated with the phone number for purchasing from the merchant during a first time period but not a second time period.

11. The method of claim 1, wherein the transaction detail includes an amount; the restriction data includes a threshold for an aggregated amount; and the determining of whether to reject the payment request includes determining whether the threshold would be exceeded by fulfillment of the payment request based on the amount.

12. The method of claim 1, wherein the restriction data includes a threshold for purchase frequency from the merchant; and the determining of whether to reject the payment request includes determining whether the threshold would be exceeded by fulfillment of the payment request.

13. The method of claim 1, further comprising:
generating, by the computing device, at least a portion of the restriction data based on input from a parent of a user of the phone number.

14. The method of claim 1, further comprising:
generating, by the computing device, at least a portion of the restriction data based on input from a merchant from which a user of the phone number has made a purchase paid for via the computing device using the phone number.

15. The method of claim 1, further comprising:
generating, by the computing device, at least a portion of the restriction data based on past payment transactions processed by the computing device using funds associated with the phone number.

16. The method of claim 1, wherein the restriction data includes indications of reasons for the restrictions; and wherein the reasons identify entities that are authorized to modify respective restrictions in the restriction data.

17. A non-transitory computer-readable storage medium storing instructions which, when executed by a computer, cause the computer to perform a method executed by an interchange computing device for managing transactions between a merchant server and a consumer having a telephonic apparatus, the method comprising:
storing, in the interchange computing device, restriction data in association with a phone number, the restriction data having at least one of a merchant and a merchant category;
receiving, in the interchange computing device, a payment request from the merchant server identifying the phone number, and a merchant identifier associated with the merchant server;

determining, by the interchange computing device, whether the restriction data is applicable to the merchant as identified by the merchant identifier;

if the restriction data is applicable to the merchant then determining, by the interchange computing device, whether to reject the payment request based at least in part on the restriction data;

if the payment request is not rejected based on the restriction data:
- communicating, by the interchange computing device, with the telephonic apparatus at the phone number to confirm the payment request,
- after confirmation of the payment request, transmitting, by the interchange computing device, a notification to the merchant, and
- fulfilling, by the interchange computing device, the payment request using funds associated with the phone number;

if the payment request is rejected based on the restriction data then determining whether the restriction data can be modified;

if the restriction data can be modified then seeking, with the interchange computing device, authorization to modify the restriction data;

if the authorization is received to modify the restriction data then:
- communicating, by the interchange computing device, with the telephonic apparatus at the phone number to confirm the payment request,
- after confirmation of the payment request, transmitting, by the interchange computing device, a notification to the merchant, and
- fulfilling, by the interchange computing device, the payment request using funds associated with the phone number; and if the payment authorization is not received then refusing, by the interchange computing device, fulfilling of the payment request.

18. A system, comprising:

a data storage facility to store restriction data in association with a phone number, the restriction data having at least one of a merchant and a merchant category; and an interchange computing device for managing transactions between a merchant server and a consumer having a telephonic apparatus coupled with the data storage facility, the interchange computing device including a common format processor and a plurality of converters to interface with a plurality of controllers, the converters configured to communicate with the controllers in different formats, the converters to communicate with the common format processor in a common format;

wherein, in response to a payment request from the merchant server identifying the phone number, and a merchant identifier associated with the merchant server, the common format processor determines, by the interchange computing device, whether the restriction data is applicable to the merchant as identified by the merchant identifier;

if the restriction data is applicable to the merchant then determining whether to reject the payment request based at least in part on the restriction data;

if the payment request is not rejected based on the restriction data:
- the common format processor uses one converter of the converters to communicate, by the interchange computing device, with a telephonic apparatus at the phone number to confirm the payment request;
- the common format processor transmits, by the interchange computing device, a notification to the merchant after confirmation of the payment request; and
- fulfilling, by the interchange computing device, the payment request using funds associated with the phone number;

if the payment request is rejected based on the restriction data then determining whether the restriction data can be modified;

if the restriction data can be modified then seeking, with the interchange computing device, authorization to modify the restriction data;

if the authorization is received to modify the restriction data then:
- i. communicating, by the interchange computing device, with the telephonic apparatus at the phone number to confirm the payment request,
- ii. after confirmation of the payment request, transmitting, by the interchange computing device, a notification to the merchant, and
- iii. fulfilling, by the interchange computing device, the payment request using funds associated with the phone number; and if the payment authorization is not received then refusing, by the interchange computing device, fulfilling of the payment request.

* * * * *